(12) United States Patent
Gibson et al.

(10) Patent No.: US 11,378,482 B2
(45) Date of Patent: Jul. 5, 2022

(54) HYDRANT CAP LEAK DETECTOR WITH ORIENTED SENSOR

(71) Applicant: Mueller International, LLC, Atlanta, GA (US)

(72) Inventors: Daryl Lee Gibson, Cleveland, TN (US); William Mark O'Brien, Toronto (CA); Bruce Robertson, Toronto (CA); Valentin Mircea Burtea, Toronto (CA); Kevin Adam Laven, Toronto (CA); Sebastien Perrier, Toronto (CA)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/079,642

(22) Filed: Oct. 26, 2020

(65) Prior Publication Data

US 2021/0041323 A1  Feb. 11, 2021

Related U.S. Application Data

(62) Division of application No. 16/121,136, filed on Sep. 4, 2018, now Pat. No. 10,859,462.

(51) Int. Cl.
*G01M 3/24* (2006.01)
*E03B 9/06* (2006.01)

(52) U.S. Cl.
CPC ............. *G01M 3/243* (2013.01); *E03B 9/06* (2013.01)

(58) Field of Classification Search
CPC ............. G01M 3/243; E03B 9/04; E03B 9/06
See application file for complete search history.

(56) References Cited

U.S. PATENT DOCUMENTS

| 1,738,094 | A | 12/1929 | Caldwell |
| 2,171,173 | A | 8/1939 | Coyer |
| 3,254,528 | A | 6/1966 | Michael |
| 3,592,967 | A | 7/1971 | Harris |
| 3,612,922 | A | 10/1971 | Furnival |
| 3,662,600 | A | 5/1972 | Rosano, Jr. et al. |
| 3,673,856 | A | 7/1972 | Panigati |
| 3,731,534 | A | 5/1973 | Painley et al. |
| 3,815,129 | A | 6/1974 | Sweany |
| 4,000,753 | A | 1/1977 | Ellis |

(Continued)

FOREIGN PATENT DOCUMENTS

| AU | 2011265675 | 5/2015 |
| AU | 2015202550 | 11/2017 |

(Continued)

OTHER PUBLICATIONS

US 11,296,403 B2, 04/2022, Gibson et al. (withdrawn)

(Continued)

*Primary Examiner* — David J Bolduc
(74) *Attorney, Agent, or Firm* — Taylor English Duma LLP

(57) ABSTRACT

A hydrant assembly includes a fire hydrant including a barrel, the barrel defining a barrel axis extending from a top barrel end of the barrel to a bottom barrel end of the barrel; and a vibration sensor enclosed within the fire hydrant, the vibration sensor defining a sensor axis extending from a first sensor end of the vibration sensor to a second sensor end of the vibration sensor, the sensor axis defining an angle relative to the barrel axis, the angle less than ninety degrees.

28 Claims, 7 Drawing Sheets

(56) References Cited

U.S. PATENT DOCUMENTS

| | | |
|---|---|---|
| 4,056,970 A | 11/1977 | Sollish |
| 4,083,229 A | 4/1978 | Anway |
| 4,333,028 A | 6/1982 | Panton |
| 4,431,873 A | 2/1984 | Dunn et al. |
| 4,462,249 A | 7/1984 | Adams |
| 4,467,236 A | 8/1984 | Kolm et al. |
| 4,543,817 A | 10/1985 | Sugiyama |
| 4,796,466 A | 1/1989 | Farmer |
| 4,844,396 A | 7/1989 | Norton |
| 4,893,679 A | 1/1990 | Martin et al. |
| 4,930,358 A | 6/1990 | Motegi et al. |
| 4,984,498 A | 1/1991 | Fishman |
| 5,038,614 A | 8/1991 | Bseisu et al. |
| 5,052,215 A | 10/1991 | Lewis |
| 5,078,006 A | 1/1992 | Maresca et al. |
| 5,085,082 A | 2/1992 | Cantor et al. |
| 5,090,234 A | 2/1992 | Maresca et al. |
| 5,117,676 A | 6/1992 | Chang |
| 5,118,464 A | 6/1992 | Richardson et al. |
| 5,163,314 A | 11/1992 | Maresca et al. |
| 5,165,280 A | 11/1992 | Sternberg et al. |
| 5,170,657 A | 12/1992 | Maresca et al. |
| 5,174,155 A | 12/1992 | Sugimoto |
| 5,187,973 A | 2/1993 | Kunze et al. |
| 5,189,904 A | 3/1993 | Maresca et al. |
| 5,201,226 A | 4/1993 | John et al. |
| 5,203,202 A | 4/1993 | Spencer |
| 5,205,173 A | 4/1993 | Allen |
| 5,209,125 A | 5/1993 | Kalinoski et al. |
| 5,218,859 A | 6/1993 | Stenstrom et al. |
| 5,243,862 A | 9/1993 | Latimer |
| 5,254,944 A | 10/1993 | Holmes et al. |
| 5,272,646 A | 12/1993 | Farmer |
| 5,279,160 A | 1/1994 | Koch |
| 5,287,884 A | 2/1994 | Cohen |
| 5,298,894 A | 3/1994 | Cerny et al. |
| 5,301,985 A | 4/1994 | Terzini |
| 5,303,592 A | 4/1994 | Livingston |
| 5,319,956 A | 6/1994 | Bogle et al. |
| 5,333,501 A | 8/1994 | Okada et al. |
| 5,335,547 A | 8/1994 | Nakajima et al. |
| 5,343,737 A | 9/1994 | Baumoel |
| 5,349,568 A | 9/1994 | Kupperman et al. |
| 5,351,655 A | 10/1994 | Nuspl |
| 5,361,636 A | 11/1994 | Farstad et al. |
| 5,367,911 A | 11/1994 | Jewell et al. |
| 5,385,049 A | 1/1995 | Hunt et al. |
| 5,396,800 A | 3/1995 | Drinon et al. |
| 5,408,883 A | 4/1995 | Clark et al. |
| 5,416,724 A | 5/1995 | Savic |
| 5,461,906 A | 10/1995 | Bogle et al. |
| 5,519,184 A | 5/1996 | Umlas |
| 5,526,691 A | 6/1996 | Latimer et al. |
| 5,531,099 A | 7/1996 | Russo |
| 5,548,530 A | 8/1996 | Baumoel |
| 5,581,037 A | 12/1996 | Kwun et al. |
| 5,591,912 A | 1/1997 | Spisak et al. |
| 5,602,327 A | 2/1997 | Torizuka et al. |
| 5,611,948 A | 3/1997 | Hawkins |
| 5,619,423 A | 4/1997 | Scrantz |
| 5,623,203 A | 4/1997 | Hosohara et al. |
| 5,633,467 A | 5/1997 | Paulson |
| 5,639,958 A | 6/1997 | Lange |
| 5,655,561 A | 8/1997 | Wendel et al. |
| 5,686,828 A | 11/1997 | Peterman et al. |
| 5,708,195 A | 1/1998 | Kurisu et al. |
| 5,708,211 A | 1/1998 | Jepson et al. |
| 5,746,611 A | 5/1998 | Brown et al. |
| 5,754,101 A | 5/1998 | Tsunetomi et al. |
| 5,760,306 A | 6/1998 | Wyatt et al. |
| 5,789,720 A | 8/1998 | Lagally et al. |
| 5,798,457 A | 8/1998 | Paulson |
| 5,838,633 A | 11/1998 | Sinha |
| 5,866,820 A | 2/1999 | Camplin et al. |
| 5,892,163 A | 4/1999 | Johnson |
| 5,898,412 A | 4/1999 | Jones et al. |
| 5,907,100 A | 5/1999 | Cook |
| 5,965,818 A | 10/1999 | Wang |
| 5,970,434 A | 10/1999 | Brophy et al. |
| 5,974,862 A | 11/1999 | Lander et al. |
| 5,987,990 A | 11/1999 | Worthington et al. |
| 6,000,277 A | 12/1999 | Smith |
| 6,000,288 A | 12/1999 | Kwun et al. |
| 6,003,376 A | 12/1999 | Burns et al. |
| 6,023,986 A | 2/2000 | Smith et al. |
| 6,035,717 A | 3/2000 | Carodiskey |
| 6,058,957 A | 5/2000 | Honigsbaum |
| 6,076,407 A | 6/2000 | Levesque et al. |
| 6,082,193 A | 7/2000 | Paulson |
| 6,089,253 A | 7/2000 | Stehling et al. |
| 6,102,444 A | 8/2000 | Kozey |
| 6,104,349 A | 8/2000 | Cohen |
| 6,125,703 A | 10/2000 | MacLauchlan et al. |
| 6,127,823 A | 10/2000 | Atherton |
| 6,127,987 A | 10/2000 | Maruyama et al. |
| 6,133,885 A | 10/2000 | Luniak et al. |
| 6,138,512 A | 10/2000 | Roberts et al. |
| 6,138,514 A | 10/2000 | Iwamoto et al. |
| 6,164,137 A | 12/2000 | Hancock et al. |
| 6,170,334 B1 | 1/2001 | Paulson |
| 6,175,380 B1 | 1/2001 | Van Den Bosch |
| 6,181,294 B1 | 1/2001 | Porter et al. |
| 6,192,352 B1 | 2/2001 | Alouani et al. |
| 6,243,657 B1 | 6/2001 | Tuck et al. |
| 6,267,000 B1 | 7/2001 | Harper et al. |
| 6,276,213 B1 | 8/2001 | Lee et al. |
| 6,296,066 B1 | 10/2001 | Terry |
| 6,343,510 B1 | 2/2002 | Neeson et al. |
| 6,363,788 B1 | 4/2002 | Gorman et al. |
| 6,389,881 B1 | 5/2002 | Yang et al. |
| 6,401,525 B1 | 6/2002 | Jamieson |
| 6,404,343 B1 | 6/2002 | Andou et al. |
| 6,442,999 B1 | 9/2002 | Baumoel |
| 6,450,542 B1 | 9/2002 | McCue |
| 6,453,247 B1 | 9/2002 | Hunaidi |
| 6,470,749 B1 | 10/2002 | Han et al. |
| 6,530,263 B1 | 3/2003 | Chana |
| 6,561,032 B1 | 5/2003 | Hunaidi |
| 6,567,006 B1 | 5/2003 | Lander et al. |
| 6,578,422 B2 | 6/2003 | Lam et al. |
| 6,595,038 B2 | 7/2003 | Williams et al. |
| 6,606,059 B1 | 8/2003 | Barabash |
| 6,624,628 B1 | 9/2003 | Kwun et al. |
| 6,639,562 B2 | 10/2003 | Suganthan et al. |
| 6,647,762 B1 | 11/2003 | Roy |
| 6,651,503 B2 | 11/2003 | Bazarov et al. |
| 6,666,095 B2 | 12/2003 | Thomas et al. |
| 6,667,709 B1 | 12/2003 | Hansen et al. |
| 6,707,762 B1 | 3/2004 | Goodman et al. |
| 6,710,600 B1 | 3/2004 | Kopecki et al. |
| 6,725,705 B1 | 4/2004 | Huebler et al. |
| 6,734,674 B1 | 5/2004 | Struse |
| 6,745,136 B2 | 6/2004 | Lam et al. |
| 6,751,560 B1 | 6/2004 | Tingley et al. |
| 6,763,730 B1 | 7/2004 | Wray |
| 6,772,636 B2 | 8/2004 | Lam et al. |
| 6,772,637 B2 | 8/2004 | Bazarov et al. |
| 6,772,638 B2 | 8/2004 | Matney et al. |
| 6,781,369 B2 | 8/2004 | Paulson et al. |
| 6,782,751 B2 | 8/2004 | Linares et al. |
| 6,789,427 B2 | 9/2004 | Batzinger et al. |
| 6,791,318 B2 | 9/2004 | Paulson et al. |
| 6,799,455 B1 | 10/2004 | Neefeldt et al. |
| 6,799,466 B2 | 10/2004 | Chinn |
| 6,813,949 B2 | 11/2004 | Masaniello et al. |
| 6,813,950 B2 | 11/2004 | Glascock et al. |
| 6,816,072 B2 | 11/2004 | Zoratti |
| 6,820,016 B2 | 11/2004 | Brown et al. |
| 6,822,742 B1 | 11/2004 | Kalayeh et al. |
| 6,843,131 B2 | 1/2005 | Graff et al. |
| 6,848,313 B2 | 2/2005 | Krieg et al. |
| 6,851,319 B2 | 2/2005 | Ziola et al. |
| 6,889,703 B2 | 5/2005 | Bond |
| 6,904,818 B2 | 6/2005 | Harthorn et al. |

(56) References Cited

U.S. PATENT DOCUMENTS

| | | |
|---|---|---|
| 6,912,472 B2 | 6/2005 | Mizushina et al. |
| 6,920,792 B2 | 7/2005 | Flora et al. |
| 6,931,931 B2 | 8/2005 | Graff et al. |
| 6,935,178 B2 | 8/2005 | Prause |
| 6,945,113 B2 | 9/2005 | Siverling et al. |
| 6,957,157 B2 | 10/2005 | Lander |
| 6,968,727 B2 | 11/2005 | Kwun et al. |
| 6,978,832 B2 | 12/2005 | Gardner et al. |
| 7,051,577 B2 | 5/2006 | Komninos |
| 7,080,557 B2 | 7/2006 | Adnan |
| 7,109,929 B1 | 9/2006 | Ryken, Jr |
| 7,111,516 B2 | 9/2006 | Bazarov et al. |
| 7,140,253 B2 | 11/2006 | Merki et al. |
| 7,143,659 B2 | 12/2006 | Stout et al. |
| 7,171,854 B2 | 2/2007 | Nagashima et al. |
| 7,231,331 B2 | 6/2007 | Davis |
| 7,234,355 B2 | 6/2007 | Dewangan et al. |
| 7,240,574 B2 | 7/2007 | Sapelnikov |
| 7,255,007 B2 | 8/2007 | Messer et al. |
| 7,261,002 B1 | 8/2007 | Gysling et al. |
| 7,266,992 B2 | 9/2007 | Shamout et al. |
| 7,274,996 B2 | 9/2007 | Lapinski |
| 7,284,433 B2 | 10/2007 | Ales et al. |
| 7,293,461 B1 | 11/2007 | Girndt |
| 7,299,697 B2 | 11/2007 | Siddu et al. |
| 7,310,877 B2 | 12/2007 | Cao et al. |
| 7,328,618 B2 | 2/2008 | Hunaidi et al. |
| 7,331,215 B2 | 2/2008 | Bond |
| 7,356,444 B2 | 4/2008 | Blemel |
| 7,360,462 B2 | 4/2008 | Nozaki et al. |
| 7,373,808 B2 | 5/2008 | Zanker et al. |
| 7,380,466 B2 | 6/2008 | Deeg |
| 7,383,721 B2 | 6/2008 | Parsons et al. |
| 7,392,709 B2 | 7/2008 | Eckert |
| 7,405,391 B2 | 7/2008 | Ogisu et al. |
| 7,412,882 B2 | 8/2008 | Lazar et al. |
| 7,412,890 B1 | 8/2008 | Johnson et al. |
| 7,414,395 B2 | 8/2008 | Gao et al. |
| 7,426,879 B2 | 9/2008 | Nozaki et al. |
| 7,458,267 B2 | 12/2008 | McCoy |
| 7,475,596 B2 | 1/2009 | Hunaidi et al. |
| 7,493,817 B2 | 2/2009 | Germata |
| 7,523,666 B2 | 4/2009 | Thompson et al. |
| 7,526,944 B2 | 5/2009 | Sabata et al. |
| 7,530,270 B2 | 5/2009 | Nozaki et al. |
| 7,543,500 B2 | 6/2009 | Litzenberg et al. |
| 7,554,345 B2 | 6/2009 | Vokey |
| 7,564,540 B2 | 7/2009 | Paulson |
| 7,587,942 B2 | 9/2009 | Smith et al. |
| 7,590,496 B2 | 9/2009 | Blemel |
| 7,596,458 B2 | 9/2009 | Lander |
| 7,607,351 B2 | 10/2009 | Allison et al. |
| 7,623,427 B2 | 11/2009 | Jann et al. |
| 7,647,829 B2 | 1/2010 | Junker et al. |
| 7,650,790 B2 | 1/2010 | Wright |
| 7,657,403 B2 | 2/2010 | Stripf et al. |
| 7,668,670 B2 | 2/2010 | Lander |
| 7,680,625 B2 | 3/2010 | Trowbridge et al. |
| 7,690,258 B2 | 4/2010 | Minagi et al. |
| 7,694,564 B2 | 4/2010 | Brignac et al. |
| 7,696,940 B1 | 4/2010 | MacDonald |
| 7,711,217 B2 | 5/2010 | Takahashi et al. |
| 7,751,989 B2 | 7/2010 | Owens et al. |
| 7,810,378 B2 | 10/2010 | Hunaidi et al. |
| 7,980,317 B1 | 7/2011 | Preta et al. |
| 8,319,508 B2 | 11/2012 | Vokey |
| 8,353,309 B1 | 1/2013 | Embry et al. |
| 8,614,745 B2 | 12/2013 | M.A.S. |
| 8,657,021 B1 | 2/2014 | Preta et al. |
| 8,668,206 B2 * | 3/2014 | Ball ............... F16L 15/04 277/637 |
| 8,674,830 B2 | 3/2014 | Lanham et al. |
| 8,843,241 B2 | 9/2014 | Saberi et al. |
| 8,931,505 B2 | 1/2015 | Hyland et al. |
| 9,053,519 B2 | 6/2015 | Scolnicov et al. |
| 9,291,520 B2 | 3/2016 | Fleury, Jr. et al. |
| 9,315,973 B2 | 4/2016 | Varman et al. |
| 9,496,943 B2 | 11/2016 | Parish et al. |
| 9,528,903 B2 | 12/2016 | Zusman |
| 9,562,623 B2 * | 2/2017 | Clark ............... F16K 37/0041 |
| 9,593,999 B2 | 3/2017 | Fleury |
| 9,772,250 B2 | 9/2017 | Richarz et al. |
| 9,780,433 B2 | 10/2017 | Schwengler et al. |
| 9,799,204 B2 | 10/2017 | Hyland et al. |
| 9,849,322 B2 | 12/2017 | Hyland et al. |
| 9,861,848 B2 | 1/2018 | Hyland et al. |
| 9,970,805 B2 * | 5/2018 | Cole ............... G01F 15/14 |
| 10,175,135 B2 | 1/2019 | Dintakurt et al. |
| 10,283,857 B2 | 5/2019 | Ortiz et al. |
| 10,305,178 B2 | 5/2019 | Gibson et al. |
| 10,317,384 B2 | 6/2019 | Morrow et al. |
| 10,386,257 B2 | 8/2019 | Fleury, Jr. et al. |
| 10,857,403 B2 | 12/2020 | Hyland et al. |
| 10,859,462 B2 | 12/2020 | Gibson et al. |
| 10,881,888 B2 | 1/2021 | Hyland et al. |
| 11,047,761 B1 * | 6/2021 | Frackelton ............... G01M 3/18 |
| 11,067,464 B2 | 7/2021 | Moreno et al. |
| 11,336,004 B2 | 5/2022 | Gibson et al. |
| 2001/0045129 A1 | 11/2001 | Williams et al. |
| 2002/0043549 A1 | 4/2002 | Taylor et al. |
| 2002/0124633 A1 | 9/2002 | Yang et al. |
| 2002/0159584 A1 | 10/2002 | Sindalovsky et al. |
| 2003/0107485 A1 | 6/2003 | Zoratti |
| 2003/0150488 A1 | 8/2003 | Fleury, Jr. et al. |
| 2003/0193193 A1 | 10/2003 | Harrington et al. |
| 2004/0129312 A1 | 7/2004 | Cuzzo et al. |
| 2004/0173006 A1 | 9/2004 | McCoy et al. |
| 2004/0187922 A1 | 9/2004 | Fleury, Jr. et al. |
| 2004/0201215 A1 | 10/2004 | Steingass |
| 2005/0005680 A1 | 1/2005 | Anderson |
| 2005/0067022 A1 | 3/2005 | Istre |
| 2005/0072214 A1 | 4/2005 | Cooper |
| 2005/0121880 A1 | 6/2005 | Santangelo |
| 2005/0153586 A1 | 7/2005 | Girinon |
| 2005/0279169 A1 | 12/2005 | Lander |
| 2006/0174707 A1 | 8/2006 | Zhang |
| 2006/0201550 A1 | 9/2006 | Blyth et al. |
| 2006/0283251 A1 | 12/2006 | Hunaidi |
| 2006/0284784 A1 | 12/2006 | Smith et al. |
| 2007/0044552 A1 | 3/2007 | Huang |
| 2007/0051187 A1 | 3/2007 | McDearmon |
| 2007/0113618 A1 | 5/2007 | Yokoi et al. |
| 2007/0130317 A1 | 6/2007 | Lander |
| 2007/0295406 A1 | 12/2007 | German et al. |
| 2008/0078567 A1 | 4/2008 | Miller et al. |
| 2008/0079640 A1 | 4/2008 | Yang |
| 2008/0168840 A1 | 7/2008 | Seeley et al. |
| 2008/0189056 A1 | 8/2008 | Heidl et al. |
| 2008/0238711 A1 | 10/2008 | Payne et al. |
| 2008/0281534 A1 | 11/2008 | Hurley |
| 2008/0307623 A1 | 12/2008 | Furukawa |
| 2008/0314122 A1 | 12/2008 | Hunaidi |
| 2009/0044628 A1 | 2/2009 | Lotscher |
| 2009/0133887 A1 | 5/2009 | Garcia et al. |
| 2009/0139336 A1 | 6/2009 | Trowbridge, Jr. et al. |
| 2009/0182099 A1 | 7/2009 | Noro et al. |
| 2009/0214941 A1 | 8/2009 | Buck et al. |
| 2009/0278293 A1 | 11/2009 | Yoshinaka et al. |
| 2009/0301571 A1 | 12/2009 | Ruhs |
| 2010/0077234 A1 | 3/2010 | Das |
| 2010/0156632 A1 | 6/2010 | Hyland et al. |
| 2010/0259461 A1 | 10/2010 | Eisenbeis et al. |
| 2010/0290201 A1 | 11/2010 | Takeuchi et al. |
| 2010/0295672 A1 | 11/2010 | Hyland et al. |
| 2011/0063172 A1 | 3/2011 | Podduturi |
| 2011/0066297 A1 | 3/2011 | Saberi |
| 2011/0079402 A1 | 4/2011 | Darby et al. |
| 2011/0102281 A1 | 5/2011 | Su |
| 2011/0162463 A1 | 7/2011 | Allen |
| 2011/0308638 A1 | 12/2011 | Hyland et al. |
| 2012/0007743 A1 | 1/2012 | Solomon |
| 2012/0007744 A1 | 1/2012 | Pal et al. |
| 2012/0169560 A1 | 7/2012 | Lee et al. |
| 2012/0296580 A1 | 11/2012 | Barkay |

(56) References Cited

U.S. PATENT DOCUMENTS

| | | |
|---|---|---|
| 2012/0324985 A1 | 12/2012 | Gu et al. |
| 2013/0036796 A1 | 2/2013 | Fleury et al. |
| 2013/0041601 A1 | 2/2013 | Dintakurti et al. |
| 2013/0049968 A1 | 2/2013 | Fleury, Jr |
| 2013/0145826 A1 | 6/2013 | Richarz et al. |
| 2013/0211797 A1 | 8/2013 | Scolnicov |
| 2013/0229262 A1 | 9/2013 | Bellows |
| 2013/0298664 A1 | 11/2013 | Gillette et al. |
| 2013/0321231 A1 | 12/2013 | Flores-Cuadras |
| 2014/0206210 A1 | 7/2014 | Ritner |
| 2014/0225787 A1 | 8/2014 | Ramachandran et al. |
| 2014/0373941 A1 | 12/2014 | Varman et al. |
| 2015/0070221 A1 | 3/2015 | Schwengler et al. |
| 2015/0082868 A1 | 3/2015 | Hyland |
| 2015/0128714 A1 | 5/2015 | Moss |
| 2016/0001114 A1 | 1/2016 | Hyland |
| 2016/0013565 A1 | 1/2016 | Ortiz |
| 2016/0018283 A1 | 1/2016 | Fleury et al. |
| 2016/0097696 A1 | 4/2016 | Zusman |
| 2017/0072238 A1 | 3/2017 | Silvers et al. |
| 2017/0121949 A1 | 5/2017 | Fleury et al. |
| 2017/0237158 A1 | 8/2017 | Gibson |
| 2017/0237165 A1 | 8/2017 | Ortiz et al. |
| 2018/0080849 A1 | 3/2018 | Showcatally et al. |
| 2018/0093117 A1 | 4/2018 | Hyland et al. |
| 2018/0224349 A1 | 8/2018 | Fleury, Jr. et al. |
| 2019/0024352 A1 | 1/2019 | Ozburn |
| 2019/0214717 A1 | 7/2019 | Gibson et al. |
| 2019/0214718 A1 | 7/2019 | Ortiz et al. |
| 2019/0316983 A1 | 10/2019 | Fleury, Jr. et al. |
| 2020/0069987 A1 | 3/2020 | Hyland et al. |
| 2020/0072697 A1 | 3/2020 | Gibson et al. |
| 2020/0212549 A1 | 7/2020 | Gibson et al. |
| 2020/0232863 A1 | 7/2020 | Moreno et al. |
| 2020/0232864 A1 | 7/2020 | Moreno et al. |
| 2020/0378859 A1 | 12/2020 | Gibson et al. |
| 2021/0023408 A1 | 1/2021 | Hyland et al. |
| 2021/0247261 A1 | 8/2021 | Gibson et al. |
| 2021/0249765 A1 | 8/2021 | Ortiz et al. |
| 2021/0355661 A1 | 11/2021 | Gibson et al. |
| 2022/0082467 A1 | 3/2022 | Fleury, Jr. et al. |

FOREIGN PATENT DOCUMENTS

| | | |
|---|---|---|
| AU | 2017248541 | 3/2019 |
| CA | 2154433 | 1/1997 |
| CA | 2397174 | 8/2008 |
| CA | 2634739 | 6/2015 |
| CA | 3010333 | 7/2020 |
| CA | 2766850 | 8/2020 |
| CA | 3023529 | 8/2020 |
| CA | 3070690 | 11/2020 |
| CA | 2842042 | 1/2021 |
| CA | 3057167 | 3/2021 |
| CA | 3057202 | 5/2021 |
| CA | 3060512 | 6/2021 |
| CA | 3010345 | 7/2021 |
| CN | 1831478 | 6/2013 |
| DE | 4211038 | 10/1993 |
| DE | 19757581 | 7/1998 |
| EP | 0711986 | 5/1996 |
| EP | 1052492 | 11/2000 |
| EP | 1077370 | 2/2001 |
| EP | 1077371 | 2/2001 |
| EP | 3293315 | 3/2018 |
| FR | 2439990 | 5/1980 |
| GB | 2250820 | 6/1992 |
| GB | 2269900 | 2/1994 |
| GB | 2367362 | 4/2002 |
| GB | 2421311 | 6/2006 |
| GB | 2550908 | 12/2017 |
| JP | 59170739 | 9/1984 |
| JP | 60111132 | 6/1985 |
| JP | 08250777 | 9/1996 |
| JP | H10-2744 | 1/1998 |
| JP | 11201859 | 7/1999 |
| JP | H11210028 | 8/1999 |
| JP | 2000131179 | 5/2000 |
| JP | 2002206965 | 7/2002 |
| JP | 2002310840 | 10/2002 |
| JP | 3595856 | 12/2004 |
| JP | 2005315663 | 11/2005 |
| JP | 2005321935 | 11/2005 |
| JP | 2006062414 | 3/2006 |
| JP | 2006062716 | 3/2006 |
| JP | 2007047139 | 2/2007 |
| JP | 2010068017 | 3/2010 |
| JP | 2013528732 | 7/2013 |
| JP | H5654124 | 11/2014 |
| KR | 101785664 | 11/2017 |
| WO | 9850771 | 11/1998 |
| WO | 0151904 | 7/2001 |
| WO | 03049528 | 6/2003 |
| WO | 2004073115 | 8/2004 |
| WO | 2008047159 | 4/2008 |
| WO | 2009057214 | 5/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2013025526 | 2/2013 |
| WO | 2014016625 | 1/2014 |
| WO | 2017139029 | 8/2017 |
| WO | 2017139030 | 8/2017 |
| WO | 2020050946 | 3/2020 |
| WO | 2021231163 | 11/2021 |

OTHER PUBLICATIONS

US 11,309,624 B2, 04/2022, Gibson et al. (withdrawn)
Gibson, Daryl Lee; Non-Final Office Action for U.S. Appl. No. 16/234,715, filed Dec. 28, 2018, dated Jan. 1, 2021, 105 pgs.
Hyland, Gregory E.; Supplemental Notice of Allowance for U.S. Appl. No. 15/817,172, filed Nov. 18, 2017, dated Dec. 7, 2020, 4 pgs.
Fleury, Jr., Leo W.; Final Office Action for U.S. Appl. No. 15/939,942, filed Mar. 29, 2018, dated Nov. 25, 2020, 37 pgs.
Gibson, Daryl Lee; Non-Final Office Action for U.S. Appl. No. 16/352,045, filed Mar. 13, 2019, dated Nov. 25, 2020, 106 pgs.
Hyland, Gregory E.; Supplemental Notice of Allowance for U.S. Appl. No. 16/675,507, filed Nov. 6, 2018, dated Nov. 10, 2020, 4 pgs.
Gibson, Daryl Lee; Office Action for Canadian patent application No. 3,057,224, filed Oct. 1, 2019, dated Nov. 10, 2020, 4 pgs.
Hyland, Gregory E.; Supplemental Notice of Allowance for U.S. Appl. No. 15/817,172, filed Nov. 18, 2017, dated Oct. 28, 2020, 4 pgs.
Gibson, Daryl Lee; Office Action for Canadian patent application No. 3,010,345, filed Dec. 20, 2016, dated Oct. 6, 2020, 4 pgs.
Gibson, Daryl Lee; Office Action for Canadian patent application No. 3,057,202, filed Oct. 1, 2018, dated Aug. 31, 2020, 4 pgs.
Keefe, Robert Paul, Office Action for Canadian application No. 3,060,512, filed May 5, 2011, dated Jul. 13, 2020, 6 pgs.
Fleury, Jr., Leo W.; Non-Final Office Action for U.S. Appl. No. 15/939,942, filed Mar. 29, 2018, dated Mar. 24, 2021, 32 pgs.
Gibson, Daryl Lee; Final Office Action for U.S. Appl. No. 16/352,045, filed Mar. 13, 2019, dated May 4, 2021, 33 pgs.
Hyland, Gregory E., Non-Final Office Action for U.S. Appl. No. 13/101,235, filed May 5, 2011, dated Jul. 31, 2013; 57 pgs.
Hyland, Gregory E.; Final Office Action for U.S. Appl. No. 13/101,235, filed May 5, 2011, dated Feb. 20, 2014; 29 pgs.
Hyland, Gregory E.; Issue Notification for U.S. Appl. No. 13/101,235, filed May 5, 2011, dated Dec. 23, 2014, 1 pg.
Hyland, Gregory E.; Non-Final Office Action for U.S. Appl. No. 13/101,235, filed May 5, 2011, dated Jun. 5, 2014, 29 pgs.
Hyland, Gregory E.; Notice of Allowance for U.S. Appl. No. 13/101,235, filed May 5, 2011, dated Sep. 11, 2014, 11 pgs.

(56) References Cited

OTHER PUBLICATIONS

Hyland, Gregory E.; Supplemental Notice of Allowability for U.S. Appl. No. 13/101,235, filed May 5, 2011, dated Nov. 25, 2014, 5 pgs.
Hyland, Gregory E.; Applicant-Initiated Interview Summary for U.S. Appl. No. 14/557,754, filed Dec. 2, 2014, dated Apr. 19, 2017, 4 pgs.
Hyland, Gregory E.; Final Office Action for U.S. Appl. No. 14/557,754, filed Dec. 2, 2014, dated Apr. 5, 2017, 23 pgs.
Hyland, Gregory E.; Final Office Action for U.S. Appl. No. 14/557,754, filed Dec. 2, 2014, dated Jun. 30, 2016, 24 pgs.
Hyland, Gregory E.; Non-Final Office Action for U.S. Appl. No. 14/557,754, filed Dec. 2, 2014, dated Jan. 19, 2016, 101 pgs.
Hyland, Gregory E.; Non-Final Office Action for U.S. Appl. No. 14/557,754, filed Dec. 2, 2014, dated Nov. 8, 2016, 48 pgs.
Hyland, Gregory E.; Notice of Allowance for U.S. Appl. No. 14/557,754, filed Dec. 2, 2014, dated Jul. 17, 2017, 14 pgs.
Hyland, Gregory E.; Notice of Decision from Post-Prosecution Pilot Program (P3) Conference for U.S. Appl. No. 14/557,754, filed Dec. 2, 2014, dated Sep. 14, 2016, 4 pgs.
Hyland, Gregory E.; Supplemental Notice of Allowability for U.S. Appl. No. 14/557,754, filed Dec. 2, 2014, dated Oct. 20, 2017, 11 pgs.
Hyland, Gregory; Issue Notification for U.S. Appl. No. 14/557,754, filed Dec. 2, 2014, dated Dec. 20, 2017, 1 pg.
Hyland, Gregory E.; Final Office Action for U.S. Appl. No. 14/848,676, filed Sep. 9, 2015, dated Aug. 19, 2016; 20 pgs.
Hyland, Gregory E.; Non-Final Office Action for U.S. Appl. No. 14/848,676, filed Sep. 9, 2015, dated Dec. 13, 2016, 52 pgs.
Hyland, Gregory E.; Notice of Allowance for U.S. Appl. No. 14/848,676, filed Sep. 9, 2015, dated Sep. 6, 2017, 12 pgs.
Hyland, Gregory E.; Supplemental Notice of Allowability for U.S. Appl. No. 14/848,676, filed Sep. 9, 2015, dated Nov. 27, 2017, 6 pgs.
Hyland, Gregory E.; Supplemental Notice of Allowability for U.S. Appl. No. 14/848,676, filed Sep. 9, 2015, dated Sep. 19, 2017, 8 pgs.
Hyland, Gregory; Final Office Action for U.S. Appl. No. 14/848,676, filed Sep. 9, 2015, dated Jun. 7, 2017, 25 pgs.
Hyland, Gregory; Non-Final Office Action for U.S. Appl. No. 14/848,676, filed Sep. 9, 2015, dated Mar. 4, 2016, 94 pgs.
Hyland, Gregory E.; Final Office Action for U.S. Appl. No. 15/817,172, filed Nov. 18, 2017, dated Jun. 11, 2020, 33 pgs.
Hyland, Gregory E.; Non-Final Office Action for U.S. Appl. No. 15/817,172, filed Nov. 18, 2017, dated Dec. 17, 2019, 23 pgs.
Hyland, Gregory E.; Non-Final Office Action for U.S. Appl. No. 15/817,172, filed Nov. 18, 2017, dated Jul. 10, 2019, 74 pgs.
Hyland, Gregory E.; Notice of Allowance for U.S. Appl. No. 15/817,172, filed Nov. 18, 2017, dated Aug. 21, 2020, 9 pgs.
Hyland, Gregory; Supplemental Notice of Allowance for U.S. Appl. No. 15/817,172, filed Nov. 18, 2017, dated Oct. 9, 2020, 4 pgs.
Hyland, Gregory E.; Final Office Action for U.S. Appl. No. 16/675,507, filed Nov. 6, 2019, dated Jun. 26, 2020, 70 pgs.
Hyland, Gregory E.; Non-Final Office Action for U.S. Appl. No. 16/675,507, filed Nov. 6, 2019, dated Jan. 28, 2020, 18 pgs.
Hyland, Gregory E.; Notice of Allowance for U.S. Appl. No. 16/675,507, filed Nov. 6, 2019, dated Oct. 23, 2020, 16 pgs.
Hyland, Gregory E.; Supplemental Notice of Allowance for U.S. Appl. No. 16/675,507, filed Nov. 6, 2019, dated Nov. 10, 2020, 4 pgs.
Fleury Jr., Leo W.; Non-Final Office Action for U.S. Appl. No. 13/492,790, filed Jun. 8, 2012, dated Nov. 5, 2014, 30 pgs.
Fleury, Jr., Leo W.; Advisory Action for U.S. Appl. No. 13/492,790, filed Jun. 8, 2012, dated Jul. 9, 2014, 3 pgs.
Fleury, Jr., Leo W.; Final Office Action for U.S. Appl. No. 13/492,790, filed Jun. 8, 2012, dated Mar. 12, 2014; 19 pgs.
Fleury, Jr., Leo W.; Issue Notification for U.S. Appl. No. 13/492,790, filed Jun. 8, 2012, dated Mar. 2, 2016, 1 pg.
Fleury, Jr., Leo W.; Non-Final Office Action for serai No. U.S. Appl. No. 13/492,790, filed Jun. 8, 2012, dated Sep. 12, 2013; 37 pgs.

Fleury, Jr., Leo W.; Notice of Allowance for U.S. Appl. No. 13/492,790, filed Jun. 8, 2012, dated Feb. 2, 2016, 9 pgs.
Fleury, Jr., Leo W.; Notice of Allowance for U.S. Appl. No. 13/492,790, filed Jun. 8, 2012, dated May 12, 2015, 9 pgs.
Fleury, Jr., Leo W.; Notice of Allowance for U.S. Appl. No. 13/492,790, filed Jun. 8, 2012, dated Sep. 23, 2015, 11 pgs.
Fleury, Leo W.; Applicant-Initiated Interview Summary for U.S. Appl. No. 14/870,070, filed Sep. 30, 2015, dated Feb. 28, 2018, 4 pgs.
Fleury, Leo W.; Final Office Action for U.S. Appl. No. 14/870,070, filed Sep. 30, 2015, dated Dec. 29, 2017, 24 pgs.
Fleury, Leo; Non-Final Office Action for U.S. Appl. No. 14/870,070, filed Sep. 30, 2015, dated Jun. 21, 2017, 88 pgs.
Fleury, Jr., Leo W.; Final Office Action for U.S. Appl. No. 15/939,942, filed Mar. 29, 2018, dated Feb. 19, 2020, 29 pgs.
Fleury, Jr., Leo W.; Non-Final Office Action for U.S. Appl. No. 15/939,942, filed Mar. 29, 2018, dated May 27, 2020, 23 pgs.
Fleury, Jr., Leo W.; Non-Final Office Action for U.S. Appl. No. 15/939,942, filed Mar. 29, 2018, dated Sep. 25, 2019, 92 pgs.
Richarz, Werner Guenther; Corrected Notice of Allowability for U.S. Appl. No. 13/492,792, filed Jun. 8, 2012, dated Aug. 29, 2017, 6 pgs.
Richarz, Werner Guenther; Final Office Action for U.S. Appl. No. 13/492,792, filed Jun. 8, 2012, dated Oct. 20, 2014, 17 pgs.
Gibson, Daryl Lee; Notice of Allowance for U.S. Appl. No. 16/121,136, filed Sep. 4, 2018, dated Sep. 29, 2020, 15 pgs.
Gibson, Daryl Lee; Non-Final Office Action for U.S. Appl. No. 16/121,136, filed Sep. 4, 2018, dated Jun. 22, 2020, 94 pgs.
Gibson, Daryl Lee; Requirement for Restriction/Election for U.S. Appl. No. 16/121,136, filed Sep. 14, 2018, dated May 7, 2020, 5 pgs.
Gibson, Daryl Lee; International Preliminary Report on Patentability for PCT Application No. PCT/US2016/067692, filed Dec. 20, 2016, dated Aug. 23, 2018, 9 pgs.
Gibson, Daryl Lee; International Search Report and Written Opinion for PCT Application No. PCT/US2016/067692, filed Dec. 20, 2016, dated Mar. 2, 2017, 10 pgs.
Gibson, Daryl Lee; Extended European Search Report for 16890115.5, filed Dec. 20, 2016, dated Jan. 24, 2020, 10 pgs.
Gibson, Daryl Lee; Office Action for Canadian patent application No. 3,010,345, filed Dec. 20, 2016, dated Dec. 16, 2019, 4 pgs.
Gibson, Daryl Lee; International Search Report and Written Opinion for PCT Application No. PCT/US19/45451, filed Aug. 7, 2019, dated Feb. 3, 2020, 11 pgs.
Gibson, Daryl Lee; Invitation to Pay Additional Fees for PCT/US19/45451, filed Aug. 7, 2019, dated Oct. 10, 2019, 2 pgs.
Gibson, Daryl Lee; Office Action for Canadian patent application No. 3,057,167, filed Aug. 7, 2019, dated May 25, 2020, 3 pgs.
Gibson, Daryl Lee; Office Action for Canadian patent application No. 3,057,167, filed Aug. 7, 2019, dated Nov. 19, 2019, 7 pgs.
Gibson, Daryl Lee; Office Action for Canadian application No. 3,057,202, filed Oct. 1, 2019, dated Aug. 31, 2020, 4 pgs.
Gibson, Daryl Lee; Office Action for Canadian application No. 3,057,202, filed Oct. 1, 2019, dated Apr. 2, 2020, 4 pgs.
Gibson, Daryl Lee; Office Action for Canadian application No. 3,057,202, filed Oct. 1, 2019, dated Dec. 19, 2019, 3 pgs.
Gibson, Daryl Lee; U.S. Provisional Application entitled: Nozzle Cap Multi-Band Antenna Assembly having U.S. Appl. No. 62/294,973, filed Feb. 12, 2016, 54 pgs.
Antenna. Merriam-Webster Dictionary, 2014 [retrieved on Jun. 1, 2014], Retrieved from the Internet: <URL: www.merriam-webster.com/dictionary/antenna>.
Hyland, Gregory E.; Issue Notification for U.S. Appl. No. 14/848,676, filed Sep. 9, 2015, dated Dec. 6, 2017, 1 pg.
Richarz, Werner Guenther; Issue Notification for U.S. Appl. No. 13/492,792, filed Jun. 8, 2012, dated Sep. 6, 2017, 1 pg.
Richarz, Werner Guenther; Notice of Allowance for U.S. Appl. No. 13/492,792, filed Jun. 8, 2012, dated Jun. 13, 2017, 31 pgs.
Richarz, Werner Guenther; Final Office Action for U.S. Appl. No. 13/492,792, filed Jun. 8, 2012, dated Sep. 8, 2016, 36 pgs.

(56) References Cited

OTHER PUBLICATIONS

"Non-Patent Literature Murata (entitled ""Piezoelectric Sounds Components""), accessed at http://web.archive.org/web/20030806141815/http://www.murata.com/catalog/p37e17.pdf, archived on Aug. 6, 2003."
"Non-Patent Literature NerdKits, accessed at http://web.archive.org/web/20090510051850/http://www.nerdkits.com/videos/sound_meter/, archived on May 10, 2009."
"Non-Patent Literature Bimorph (entitled ""Bimoprh actuators""), accessed at http://web.archive.org/web/20080122050424/http://www.elpapiezo.ru/eng/curve_e.shtml, archived on Jan. 22, 2008."
Richarz, Werner Guenther; Non-Final Office Action for U.S. Appl. No. 13/492,792, filed Jun. 8, 2012, dated Mar. 8, 2016, 27 pgs.
Richarz, Werner Guenther; Final Office Action for U.S. Appl. No. 13/492,792, filed Jun. 8, 2012, dated Sep. 10, 2015, 20 pgs.
Richarz, Werner Guenther; Non-Final Office Action for U.S. Appl. No. 13/492,792, filed Jun. 8, 2012, dated Feb. 27, 2015, 15 pgs.
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
Richarz, Werner Guenther; Non-Final Office Action for U.S. Appl. No. 13/492,792, filed Jun. 8, 2012, dated Jun. 4, 2014, 24 pgs.
Richarz, Werner Guenther; Non-Final Office Action for U.S. Appl. No. 13/492,792, filed Jun. 8, 2012, dated Nov. 6, 2013, 39 pgs.
Richarz, Werner Guenther; Restriction Requirement for U.S. Appl. No. 13/492,792, filed Jun. 8, 2012, dated Sep. 27, 2013; 5 pgs.
Dintakurti, Ganapathi Deva Varma; Issue Notification for U.S. Appl. No. 13/492,794, filed Jun. 8, 2012, dated Dec. 19, 2018, 1 pg.
Dintakurti, Ganapathi Deva Varma; Corrected Notice of Allowance for U.S. Appl. No. 13/492,794, filed Jun. 8, 2012, dated Dec. 6, 2018, 6 pgs.
Dintakurti, Ganapathi Deva Varma; Notice of Allowance for U.S. Appl. No. 13/492,794, filed Jun. 8, 2012, dated Sep. 24, 2018, 21 pgs.
Dintakurti, Ganapathi Deva Varma; Final Office Action for U.S. Appl. No. 13/492,794, filed Jun. 8, 2012, dated Jun. 22, 2018, 39 pgs.
Dintakurti, Ganapathi Deva Varma; Non-Final Office Action for U.S. Appl. No. 13/492,794, filed Jun. 8, 2012, dated Jan. 11, 2018, 38 pgs.
Dintakurti, Ganapathi Deva Varma; Final Office Action for U.S. Appl. No. 13/492,794, filed Jun. 8, 2012, dated Oct. 18, 2017, 38 pgs.
Dintakurti, Ganapathi Deva Varma; Non-Final Office Action for U.S. Appl. No. 13/492,794, filed Jun. 8, 2012, dated Mar. 16, 2017, 30 pgs.
Dintakurti, Ganapathi Deva Varma; Final Office Action for U.S. Appl. No. 13/492,794, filed Jun. 8, 2012, dated Nov. 8, 2016, 31 pgs.
Dintakurti, Ganapathi Deva Varma; Non-Final Office Action for U.S. Appl. No. 13/492,794, filed Jun. 8, 2012, dated May 17, 2016, 48 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Non-Final Office Action for U.S. Appl. No. 13/492,794, filed Jun. 8, 2012, dated Jan. 16, 2015, 60 pgs.
Fleury, Jr., Leo W.; Issue Notification for U.S. Appl. No. 13/492,795, filed Jun. 8, 2012, dated Feb. 22, 2017; 1 page.
Fleury, Jr., Leo W.; Corrected Notice of Allowability for U.S. Appl. No. 13/492,795, filed Jun. 8, 2012, dated Feb. 14, 2017; 8 pgs.
Fleury, Jr., Leo W.; Supplemental Notice of Allowance for U.S. Appl. No. 13/492,795, filed Jun. 8, 2012, dated Nov. 22, 2016; 8 pgs.
Fleury, Jr., Leo W.; Notice of Allowability for U.S. Appl. No. 13/492,795, filed Jun. 8, 2012, dated Oct. 24, 2016, 13 pgs.
Fleury, Jr., Leo W.; Notice of Allowance for U.S. Appl. No. 13/492,795, filed Jun. 8, 2012, dated Sep. 21, 2016, 18 pgs.

Fleury, Jr., Leo W.; Non-Final Office Action for U.S. Appl. No. 13/492,795, filed Jun. 8, 2012, dated Mar. 1, 2016, 42 pgs.
Fleury, Jr., Leo W.; Advisory Action for U.S. Appl. No. 13/492,795, filed Jun. 8, 2012, dated Sep. 9, 2015, 3 pgs.
Fleury, Jr., Leo W.; Final Office Action for U.S. Appl. No. 13/492,795, filed Jun. 8, 2012, dated May 22, 2015, 28 pgs.
Non-Patent Literature "Radiodetection Water Leak Detection Products", 2008, Radiodetection Ltd.—SPX Corporation.
Fleury, Jr., Leo W.; Non-Final Office Action for U.S. Appl. No. 13/492,795, filed Jun. 8, 2012, dated Oct. 21, 2014, 37 pgs.
Fleury, Jr., Leo W.; Advisory Action for U.S. Appl. No. 13/492,795, filed Jun. 8, 2012, dated Jun. 18, 2014, 4 pgs.
Fleury, Jr., Leo W.; Final Office Action for U.S. Appl. No. 13/492,795, filed Jun. 8, 2012, dated Apr. 23, 2014, 19 pgs.
Fleury Jr, Leo W.; Non-Final Office Action for U.S. Appl. No. 13/492,795, filed Jun. 8, 2012, dated Sep. 23, 2013; 35 pgs.
Fleury, Jr., Leo W.; Corrected Notice of Allowance for U.S. Appl. No. 15/401,457, filed Jan. 9, 2017, dated Jun. 26, 2019, 55 pgs.
Fleury, Jr., Leo W.; Notice of Allowance for U.S. Appl. No. 15/401,457, filed Jan. 9, 2017, dated Apr. 16, 2019, 88 pgs.
Hyland; International Preliminary Report on Patentability for serial No. PCT/US2011/035374, filed May 5, 2011, dated Dec. 19, 2012; 5 pgs.
Hyland; International Search Report and Written Opinion for serial No. PCT/US2011/035374, filed May 5, 2011, dated Sep. 13, 2011; 7 pgs.
Hyland, Gregory E.; Office Action for Canadian patent application No. 2,766,850, filed May 5, 2011, dated Jun. 19, 2019, 4 pgs.
Hyland, Gregory E.; Office Action for Canadian application No. 2,766,850, filed May 5, 2011, dated Aug. 16, 2018, 4 pgs.
Hyland, Gregory E..; Office Action for Canadian Patent Application No. 2,766,850, filed May 5, 2011, dated Mar. 13, 2017, 4 pgs.
Hyland, Gregory E.; Mexico Office Action for serial No. MX/a/2012/000347, filed May 5, 2011, dated Dec. 13, 2016, 5 pgs.
Hyland, Gregory E.; Mexico Office Action for serial No. MX/a/2012/000347, filed May 5, 2011, dated Aug. 31, 2016, 4 pgs.
Hyland, Gregory E.; Mexico Office Action for serial No. MX/a/2012/000347, filed May 5, 2011, dated May 30, 2016, 4 pgs.
Hyland, Gregory E.; Office Action for European patent application No. 11796120.1, filed May 5, 2011, dated Feb. 9, 2018, 4 pgs.
Ortiz, Jorge Isaac; Non-Final Office Action for U.S. Appl. No. 16/354,939, filed Mar. 15, 2019, dated Aug. 10, 2021, 126 pgs.
Ortiz, Jorge Isaac; Requirement for Restriction/Election for U.S. Appl. No. 17/245,181, filed Apr. 30, 2021, dated Jul. 22, 2021, 6 pgs.
Gibson, Daryl Lee; Non-Final Office Action for U.S. Appl. No. 16/352,045, filed Mar. 13, 2019, dated Aug. 13, 2021, 20 pgs.
Gibson, Daryl Lee; Final Office Action for U.S. Appl. No. 16/234,715, filed Dec. 28, 2018, dated Aug. 5, 2021, 21 pgs.
ABT, Inc., Installation Instructions Belleville Washer springs (Year: 2014), 1 pg.
Gibson, Daryl Lee; Non-Final Office Action for U.S. Appl. No. 16/428,744, filed May 31, 2019, dated Aug. 2, 2021, 121 pgs.
QRFS, Storz FDCs and fire Hydrant Storz connections: Adapters or integral Storz, Mar. 2019 (Year: 2019), 21 pgs.
Speacialinsert, Inserts for plastic (Year: 2016), 36 pgs.
Gibson, Daryl Lee; Invitation to Pay Additional Fees for PCT/US21/31033, filed May 6, 2021, dated Jul. 15, 2021, 2 pgs.
Hyland, Gregory; Extended European Search Report for serial No. 11796120.1, filed May 5, 2011, dated Nov. 4, 2016, 8 pgs.
Hyland, Gregory E.; Australian Patent Examination Report for serial No. 2011265675, filed Jan. 21, 2012, dated Oct. 1, 2014, 3 pgs.
Hyland, Gregory E ; Japanese Office Action for serial No. 2013515338, filed Jan. 30, 2012, dated Jun. 10, 2014, 8 pgs.
Hyland, Gregory E.; Japanese Office Action for serial No. 2014-234642, filed May 5, 2011, dated Nov. 4, 2015,9 pgs.
Hyland, Gregory E ; Japanese Office Action for serial No. 2014-234642, filed May 5, 2011, dated Jul. 7, 2015, 9 pgs.
Hyland, Gregory E.; Australian Examination Report for Serial No. 2015202550, filed May 5, 2011, dated Jul. 5, 2017, 4 pgs.
Hyland, Gregory E.; Australian Examination Report for Serial No. 2015202550, filed May 5, 2011, dated May 16, 2017, 5 pgs.

(56) References Cited

OTHER PUBLICATIONS

Hyland, Gregory E.; Australian Examination Report for serial No. 2015202550, filed May 5, 2011, dated Feb. 9, 2017, 4 pgs.
Hyland, Gregory E.; Australian Examination Report for serial No. 2015202550, filed May 5, 2011, dated Aug. 12, 2016, 4 pgs.
Hyland, Gregory E.; Office Action for Mexico Patent Application No. MX/a/2017/006090, filed May 5, 2011, dated Sep. 26, 2018, 4 pgs.
Hyland, Gregory E.; Examination Report for Australian patent application No. 2017248541, filed Oct. 20, 2017, dated Apr. 20, 2018, 5 pgs.
Hyland, Gregory E.; Office Action for Canadian patent application No. 3,023,529, filed May 5, 2011, dated Nov. 26, 2019, 4 pgs.
Keefe, Robert Paul, Office Action for Canadian application No. 3,060,512, filed May 5, 2011, dated Apr. 22, 2020, 5 pgs.
Fleury, Leo W.; International Preliminary Report on Patentability for serial No. PCT/US12/50390 filed Aug. 10, 2012, dated Feb. 18, 2014, 14 pgs.
Fleury, Leo W.; International Search Report and Written Opinion for serial No. PCT/US12/50390 filed Aug. 10, 2012, dated Dec. 17, 2012, 18 pgs.
Fleury Jr., Leo W.; European Search Report for Serial No. 12823594, filed Aug. 10, 2012, dated Dec. 21, 2017, 4 pgs.
Fleury Jr., Leo W.; European Search Report for Serial No. 12823594, filed Aug. 10, 2012, dated May 10, 2017, 4 pgs.
Fleury Jr., Leo W.; European Search Report for serial No. 12823594, filed Aug. 10, 2012, dated Jun. 8, 2015, 11 pgs.
Fleury, et al.; Supplemental European Search Report for application No. 12823594.2, filed Aug. 20, 2012, dated Feb. 18, 2015, 6 pgs.
Fleury, Leo W.; Office Action for Canadian patent application No. 2,842,042, filed Aug. 10, 2012, dated Dec. 5, 2019, 3 pgs.
Gibson, Daryl Lee; Corrected Notice of Allowance for U.S. Appl. No. 16/121,136, filed Sep. 4, 2018, dated Nov. 9, 2020, 6 pgs.
Fleury, Leo W.; Office Action for Canadian application No. 2,842,042, filed Aug. 10, 2012, dated Feb. 28, 2019, 3 pgs.
Fleury, Leo W.; Office Action for Canadian application No. 2,842,042, filed Aug. 10, 2012, dated Apr. 24, 2018, 3 pgs.
Fleury, Leo W., U.S. Provisional Patent Application Entitled: Hydrant Leak Detector Communication Device, System, and Method under U.S. Appl. No. 61/523,274, filed Aug. 12, 2011; 35 pgs.
Hunaidi, Osama; Issue Notification for U.S. Appl. No. 11/766,288, filed Jun. 21, 2007, dated Sep. 22, 2010, 1 pg.
Hunaidi, Osama; Notice of Allowance for U.S. Appl. No. 11/766,288, filed Jun. 21, 2007, dated Jun. 24, 2010, 8 pgs.
Hunaidi, Osama; Non-Final Office Action for U.S. Appl. No. 11/766,288, filed Jun. 21, 2007, dated Jan. 20, 2010, 50 pgs.
Hunaidi, Osama; Notice of Allowance for U.S. Appl. No. 09/482,317, filed Jan. 14, 2000, dated May 13, 2002, 4 pgs.
Hunaidi, Osama; Non-final Office Action for U.S. Appl. No. 09/482,317, filed Jan. 14, 2000, dated Dec. 17, 2001, 6 pgs.
Peter, Russo Anthony; European Search Report for Patent Application No. EP95307807, filed Nov. 1, 1995, dated Jul. 22, 1998, 5 pgs.
Ortiz, Jorge Isaac; Issue Notification for U.S. Appl. No. 15/043,057, filed Feb. 12, 2016, dated Apr. 17, 2019, 1 pg.
Ortiz, Jorge Isaac; Supplemental Notice of Allowance for U.S. Appl. No. 15/043,057, filed Feb. 12, 2016, dated Mar. 13, 2019, 6 pgs.
Ortiz, Jorge Isaac; Notice of Allowance for U.S. Appl. No. 15/043,057, filed Feb. 12, 2016, dated Feb. 19, 2019, 8 pgs.
Ortiz, Jorge Isaac; Final Office Action for U.S. Appl. No. 15/043,057, filed Feb. 12, 2016, dated Dec. 12, 2018, 25 pgs.
Ortiz, Jorge Isaac; Non-Final Office Action for U.S. Appl. No. 15/043,057, filed Feb. 12, 2016, dated Jun. 4, 2018, 94 pgs.
Ortiz, Jorge Isaac; International Preliminary Report on Patentability for PCT Application No. PCT/US2016/067689, filed Dec. 20, 2016, dated Aug. 23, 2018, 8 pgs.
Ortiz, Jorge; International Search Report and Written Opinion for PCT/US16/67689, filed Dec. 20, 2016, dated Mar. 8, 2017, 9 pgs.
Ortiz, Jorge Isaac; Extended European Search Report for serial No. 16890114.8, filed Dec. 20, 2016, dated Sep. 26, 2019, 11 pgs.

Ortiz, Jorge Isaac; Office Action for Canadian patent application No. 3,010,333, filed Dec. 20, 2016, dated Dec. 6, 2019, 4 pgs.
Oritz, Jorge Isaac; Office Action for Canadian patent application No. 3,070,690, filed Dec. 20, 2016, dated Mar. 10, 2020, 3 pgs.
Bracken, Marc; U.S. Provisional Application entitled: Detecting Leaks in Water Pipes, having U.S. Appl. No. 61/719,320, filed Oct. 26, 2012, 33 pgs.
Splitz, David Edwin; U.S. Provisional Patent Application entitled: Automatic Discovery of Nodes in a Mesh Network, U.S. Appl. No. 61/779,896, filed Mar. 13, 2013; 110 pgs.
Gibson, Daryl Lee; Corrected Notice of Allowance for U.S. Appl. No. 15/255,795, filed Sep. 2, 2016, dated Mar. 21, 2019, 6 pgs.
Gibson, Daryl Lee; Notice of Allowance for U.S. Appl. No. 15/255,795, filed Sep. 2, 2016, dated Jan. 17, 2019, 17 pgs.
Gibson, Daryl Lee; Final Office Action for U.S. Appl. No. 15/255,795, filed Sep. 2, 2016, dated Aug. 31, 2018, 33 pgs.
Gibson, Daryl Lee; Non-Final Office Action for U.S. Appl. No. 15/255,795, filed Sep. 2, 2016, dated Feb. 23, 2018, 86 pgs.
Fleuryjr., Leo W.; Final Office Action for U.S. Patent Application No. 15/939,942, filed Mar. 29, 2018, dated Aug. 27, 2021, 30 pgs
Gibson, Daryl Lee; Non-Final Office Action for U.S. Appl. No. 17/245,419, filed Apr. 30, 2021, dated Sep. 2, 2021, 82 pgs.
Gibson, Daryl; Office Action for U.S. Pat. No. 3,057,224, filed Oct. 1, 2019, dated Jun. 23, 2021, 4 pgs.
Ortiz, Jorge Isaac; Non-Final Office Action for U.S. Appl. No. 17/245,181, filed Apr. 30, 2021, dated Sep. 16, 2021, 82 pgs.
Ortiz, Jorge Isaac; Office Action for European patent application No. 16890114.8, filed Dec. 20, 2016, dated Oct. 4, 2021, 7 pgs.
Gibson, Daryl Lee; Applicant-Initiated Interview Summary for U.S. Appl. No. 16/234,715, filed Dec. 28, 2018, dated Oct. 14, 2021, 2 pgs.
Gibson, Daryl Lee; Extended European Search Report for application No. 21180958.7, filed Aug. 7, 2019, dated Oct. 5, 2021, 8 pgs.
Gibson, Daryl Lee; International Search Report and Written Opinion for PCT Application No. PCT/US21/31033, filed May 6, 2021, dated Sep. 24, 2021, 12 pgs.
Fleury Jr., Leo W., Advisory Action for U.S. Appl. No. 15/939,942, filed Mar. 29, 2018, dated Dec. 7, 2021, 2 pgs.
Ortiz, Jorge Isaac; Final Office Action for U.S. Appl. No. 17/245,181, filed Apr. 30, 2021, dated Dec. 7, 2021, 28 pgs.
Ortiz, Jorge Isaac; Office Action for Canadian patent application No. 3,095,465, filed Dec. 20, 2016, dated Nov. 8, 2021, 4 pgs.
Gibson, Daryl Lee; Notice of Allowance for U.S. Appl. No. 16/352,045, filed Mar. 13, 2019, dated Dec. 1, 2021, 24 pgs.
Gibson, Daryl Lee; Notice of Allowance for U.S. Appl. No. 16/234,715, filed Dec. 28, 2018, dated Dec. 7, 2021, 23 pgs.
Gibson, Daryl Lee; Applicant-Initiated Interview Summary for U.S. Appl. No. 17/245,419, filed Apr. 30, 2021, dated Dec. 2, 2021, 2 pgs.
Gibson, Daryl Lee; Final Office Action for U.S. Appl. No. 17/245,419, filed Apr. 30, 2021, dated Oct. 25, 2021, 27 pgs.
Gibson, Daryl Lee; Non-Final Office Action for U.S. Appl. No. 17/245,419, filed Apr. 30, 2021, dated Jan. 14, 2022, 27 pgs.
Hyland, Gregory E.; Non-Final Office Action for U.S. Appl. No. 17/071,632, filed Oct. 15, 2020, dated Mar. 30, 2022, 89 pgs.
Fleury, Jr.; Non-Final Office Action for U.S. Appl. No. 16/453,318, filed Jun. 26, 2019, dated Mar. 2, 2022, 129 pgs.
Fleury, Leo W Jr.; Office Action for Canadian patent application No. 3,102,529, filed Aug. 10, 2012, dated Mar. 16, 2022, 4 pgs.
Ortiz, Jorge Isaac; Final Office Action for U.S. Appl. No. 16/354,939, filed Mar. 15, 2019, dated Mar. 17, 2022, 40 pgs.
Ortiz, Jorge Isaac; Notice of Allowance for U.S. Appl. No. 17/245,181, filed Apr. 30, 2021, dated Mar. 7, 2022, 13 pgs.
3Ibson, Daryl Lee; Notice of Allowance for U.S. Appl. No. 16/428,744, filed May 31, 2019, dated Mar. 16, 2022, 34 pgs.
Gibson, Daryl Lee; Applicant-Initiated Interview Summary for U.S. Appl. No. 17/245,419, filed Apr. 30, 2021 dated Mar. 8, 2022, 2 pgs.
Sibson, Daryl Lee; Final Office Action for U.S. Appl. No. 17/245,419, filed Apr. 30, 2021, dated Apr. 8, 2022, 31 pgs.
Sibson, Daryl Lee; Office Action for Canadian patent application No. 3,105,683, filed Aug. 7, 2019, dated Mar. 8, 2022, 4 pgs.

(56) References Cited

OTHER PUBLICATIONS

Sibson, Daryl Lee; Extended European Search Report for application No. 19857477.4, filed Aug. 7, 2019, dated Jan. 5, 2022, 7 pgs.

* cited by examiner

HYDRANT CAP LEAK DETECTOR WITH ORIENTED SENSOR

REFERENCE TO RELATED APPLICATION

This application is a divisional of U.S. application Ser. No. 16/121,136, filed Sep. 4, 2018, which is hereby specifically incorporated by reference herein in its entirety.

TECHNICAL FIELD

This disclosure relates to fire hydrants. More specifically, this disclosure relates to a vibration sensor for detecting leaks in a water system connected to a fire hydrant.

BACKGROUND

Fire hydrants are commonly connected to fluid systems, such as municipal water infrastructure systems and water mains, through stand pipes. Because these fluid systems are typically partially or entirely located underground, it can be difficult to detect leaks within the fluid systems. Additionally, it can be difficult to access these fluid systems for monitoring. Fire hydrants can provide convenient aboveground access to the fluid systems. Leaks within the fluid systems can send vibrations through the fluid system and up stand pipes to the fire hydrants. These vibrations propagating through the stand pipes and fire hydrants can be monitored to detect leaks within the connected fluid system. However, fire hydrants can be subjected to other sources of vibration such as wind, rain, ambient noise from loud passing vehicles, or direct contact such as pedestrians bumping into fire hydrants or bicyclists leaning their bicycles against fire hydrants. These sources of background noise can trigger false alarms or make it more difficult for a potential leak to be detected.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a nozzle cap comprising a cap body, the cap body defining a cap axis extending from a first body end of the cap body to a second body end of the cap body; and a vibration sensor attached to the cap body, the vibration sensor defining a sensor axis extending from a first sensor end of the vibration sensor to a second sensor end of the vibration sensor, the sensor axis aligned perpendicular to the cap axis.

Also disclosed is a hydrant assembly comprising a fire hydrant comprising a barrel, the barrel defining a barrel axis extending from a top barrel end of the barrel to a bottom barrel end of the barrel; and a vibration sensor enclosed within the fire hydrant, the vibration sensor defining a sensor axis extending from a first sensor end of the vibration sensor to a second sensor end of the vibration sensor, the sensor axis defining an angle relative to the barrel axis, the angle less than ninety degrees.

Also disclosed is a method for detecting leaks in a fluid system, the method comprising enclosing a vibration sensor within a fire hydrant, the fire hydrant connected in fluid communication with the fluid system; and positioning a sensor axis of the vibration sensor at an angle of less than ninety degrees to a barrel axis of the fire hydrant.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
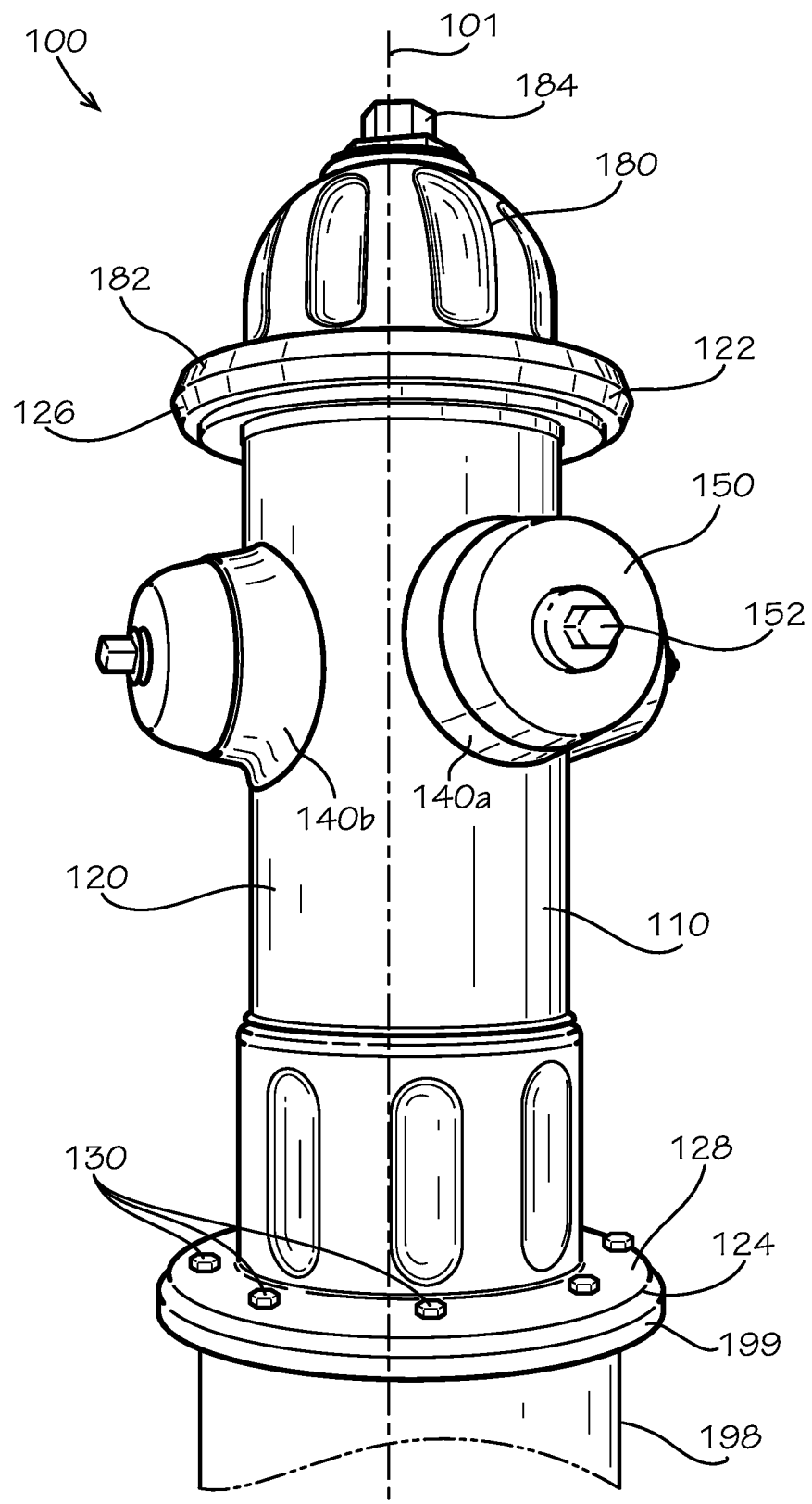
FIG. 1 is a perspective view of a hydrant assembly in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure.

It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a hydrant assembly and associated methods, systems, devices, and various apparatus. The hydrant assembly can comprise a fire hydrant and a vibration sensor. It would be understood by one of skill in the art that the disclosed hydrant assembly is described in but a few exemplary aspects among many. No particular terminology or description should be considered limiting on the disclosure or the scope of any claims issuing therefrom.

FIG. 1 is a perspective view of a hydrant assembly 100 comprising a fire hydrant 110 and a vibration sensor 380 (shown in FIG. 3) in accordance with one aspect of the present disclosure. The fire hydrant 110 can comprise a barrel 120, a nozzle cap 150, and a bonnet 180. The barrel 120 can define a top barrel end 122 and a bottom barrel end 124 disposed opposite from the top barrel end 122. The barrel 120 can be substantially tubular, and the barrel 120 can define a barrel axis 101 extending from the top barrel end 122 to the bottom barrel end 124. In the present aspect, the barrel axis 101 can be substantially vertically aligned wherein the barrel axis 101 is aligned with the force of gravity.

The barrel 120 can comprise a top flange 126 disposed at the top barrel end 122 and a base flange 128 disposed at the bottom barrel end 124. The base flange 128 can be fastened to a stand pipe flange 199 of a stand pipe 198 of a fluid system (not shown), such as a water main for example and without limitation. The base flange 128 can be fastened to the stand pipe flange 199 by a plurality of fasteners 130. A bonnet flange 182 of the bonnet 180 can be attached to the top flange 126 of the barrel 120, such as with a plurality of fasteners (not shown) similar to the fasteners 130. The bonnet 180 can comprise an operation nut 184, or "op nut", which can be rotated to open and close a main valve (not shown) positioned at the bottom barrel end 124 or below in the stand pipe 198 in order to respectively supply or cut off pressurized water flow to the fire hydrant 110.

The barrel 120 can define one or more nozzles 140a,b. The nozzle cap 150 can be screwed onto the nozzle 140a to seal the nozzle 140a. With the nozzle cap 150 sealing the nozzle 140a, pressurized water cannot escape through the nozzle 140a when the main valve (not shown) is in an open position. The nozzle cap 150 can define a cap nut 152 which can be turned, such as with a wrench, to tighten or loosen the nozzle cap 150 on the nozzle 140a.

Figure 2:
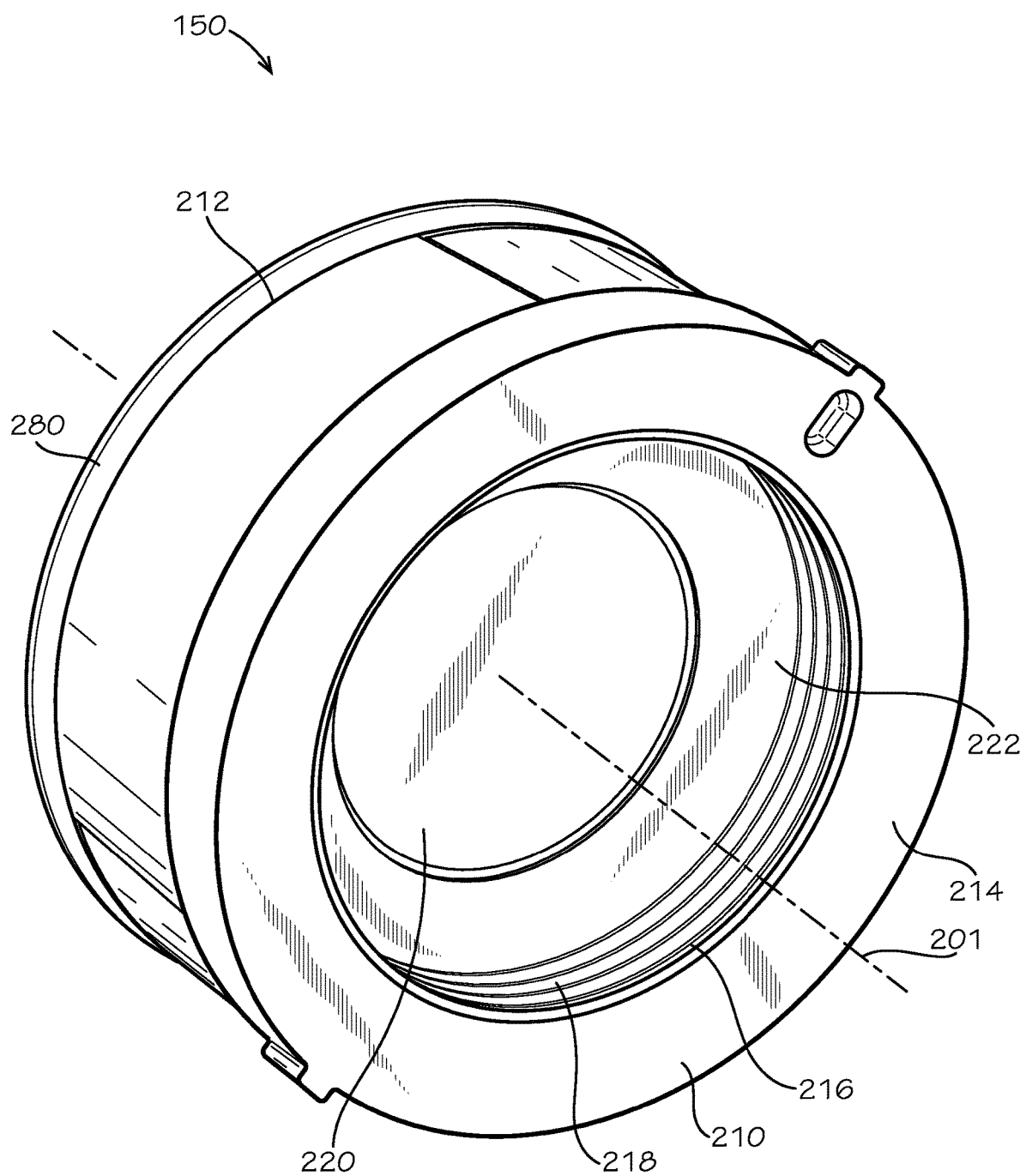
FIG. 2 is a perspective rear view of a nozzle cap of the hydrant assembly of FIG. 1.

FIG. 2 is a perspective rear view of the nozzle cap 150 of the fire hydrant 110 of FIG. 1. The nozzle cap 150 can comprise a cap body 210 and a cap cover 280. The cap body 210 can define a first body end 212 and a second body end 214 disposed opposite from the first body end 212. The cap cover 280 can be attached to the first body end 212 of the cap body 210. The cap body 210 can define a threaded bore 216 extending into the cap body 210 from the second body end 214 to an inner wall 220 of the cap body 210. The threaded bore 216 can define a cap axis 201 of the cap body 210, and the cap axis 201 can extend from the first body end 212 to the second body end 214.

The threaded bore 216 can define internal threading 218, and the threaded bore 216 can be screwed onto the nozzle 140a (shown in FIG. 1) to mount the nozzle cap 150 on the nozzle 140a by rotating the nozzle cap 150 about the cap axis 201. In the present aspect, the internal threading 218 can be straight threading that does not taper from the second body end 214 towards the inner wall 220. In other aspects, the internal threading 218 can be tapered threading that tapers from the second body end 214 towards the inner wall 220. A gasket 222 can be positioned adjacent to the inner wall 220, and the gasket 222 can be configured to form a seal with the nozzle 140a (shown in FIG. 1) when the nozzle cap 150 is screwed onto the nozzle 140a in a sealed position. As described below with respect to FIGS. 6 and 7, the gasket 222 can be selected based on its thickness, measured axially along the cap axis 201, to alter a rotational indexing of the nozzle cap 150 relative to the nozzle 140a.

Figure 3:
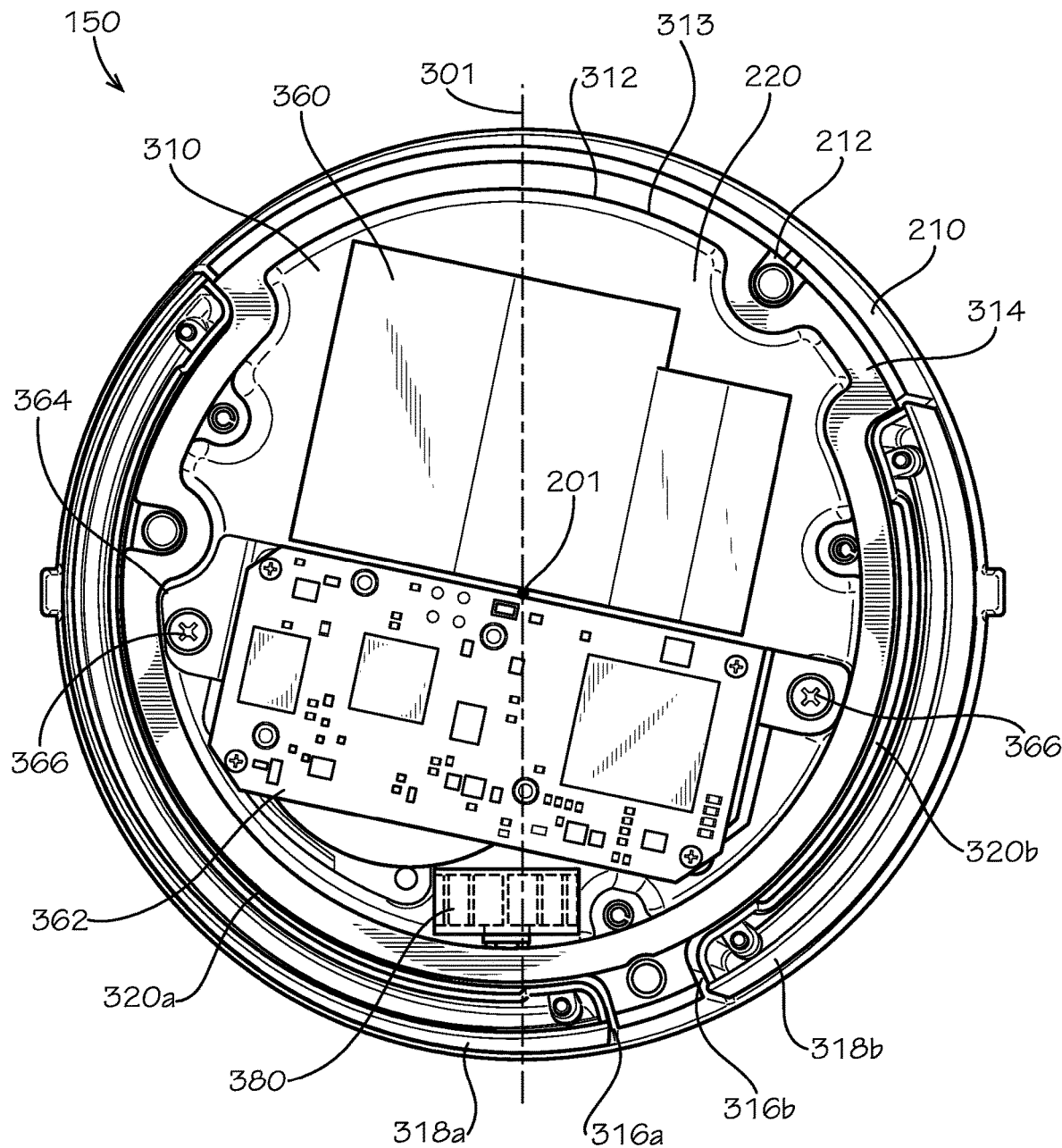
FIG. 3 is a front view of the nozzle cap of FIG. 2 shown with a cap cover 280 of the nozzle cap removed.

FIG. 3 is a front view of the nozzle cap 150 of FIG. 1 with the cap cover 280 (shown in FIG. 2) removed from the cap body 210. The cap body 210 can define a cavity 310 extending inwards into the cap body 210 from the first body end 212 to the inner wall 220. In the present aspect, the cavity 310 can extend axially inward relative to the cap axis 201, shown extending out of the page. The inner wall 220 can separate the cavity 310 from the threaded bore 216 (shown in FIG. 2). The cap body 210 can define a circumferential wall 312 which partially encloses the cavity 310 and extends circumferentially around the cavity 310 relative to the cap axis 201. A cavity opening 313 to the cavity 310 can be defined at the first body end 212, and a cavity gasket 314 can extend around the cavity opening 313. The cavity gasket 314 can be configured to seal with the cap cover 280 to enclose and seal the cavity 310.

The circumferential wall 312 can define external scallops 316a,b. The external scallops 316a,b can extend radially inward into the circumferential wall 312 relative to the cap axis 201. Each of the external scallops 316a,b can respectively be enclosed by an antenna cover 318a,b, and an antenna strip 320a,b can be enclosed within each of the external scallops 316a,b between the respective antenna cover 318a,b and the circumferential wall 312.

The nozzle cap 150 can comprise a battery pack 360 and a printed circuit board ("PCB") 362, each disposed within the cavity 310. The PCB 362 can be attached to a mounting bracket 364 which can be secured within the cavity 310 by a pair of fasteners 366.

As shown, the nozzle cap 150 of the fire hydrant 110 can also comprise the vibration sensor 380 of the hydrant assembly 100, and the vibration sensor 380 can be disposed within the cavity 310. The vibration sensor 380 can define a sensor axis 301 which can be perpendicular to the cap axis 201. The vibration sensor 380 can be attached to the circumferential wall 312, and the vibration sensor 380 can extend radially inward from the circumferential wall 312 and into the cavity 310 with respect to the cap axis 201.

The battery pack 360, the PCB 362, the vibration sensor 380, and the antenna strips 320a,b can be connected together in electrical communication. The vibration sensor 380 can be configured to detect leaks within the fluid system (not shown) by monitoring vibrations traveling up the stand pipe 198 (shown in FIG. 1) and through the fire hydrant 110 (shown in FIG. 1) when the nozzle cap 150 is mounted on the nozzle 140a (shown in FIG. 1). Vibration patterns within the fluid system can indicate the presence of leaks within the fluid system. The vibration sensor 380 can produce voltage readings when the vibration sensor 380 experiences vibrations. These voltage readings can be processed by the PCB 362 to determine whether leaks are present, and a signal can be transmitted outwards from the nozzle cap 150 by the antenna strips 320a,b to convey whether leaks have been identified within the fluid system.

Figure 4:
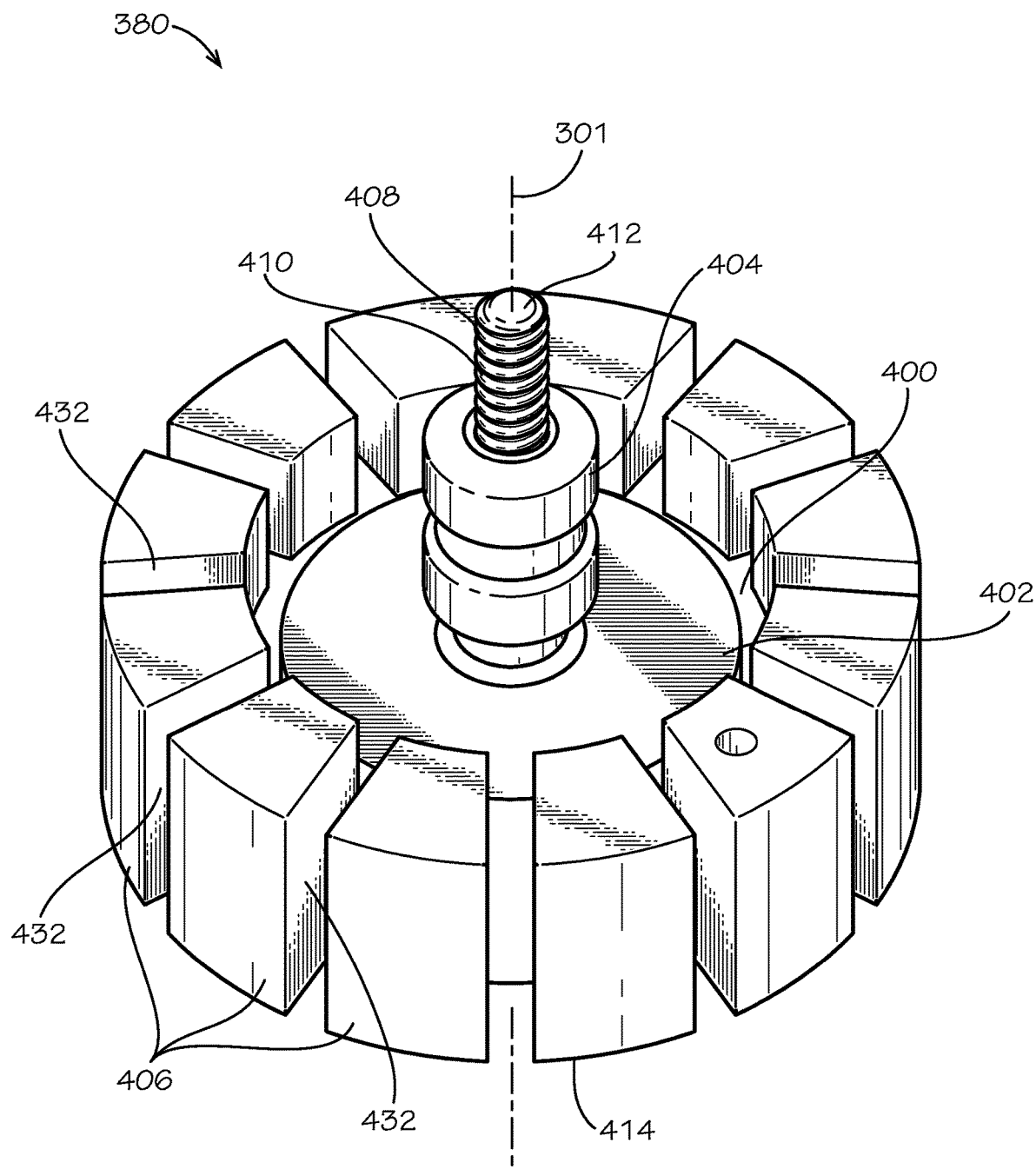
FIG. 4 is a perspective view of one example aspect of a vibration sensor in accordance with one aspect of the present disclosure.

FIG. 4 is a perspective view of one example aspect of the vibration sensor 380 of FIG. 3 wherein the vibration sensor 380 is a piezoelectric vibration sensor. Piezoelectric vibration sensors are described in greater detail in U.S. Pat. No. 9,528,903, issued Dec. 27, 2016, which is hereby incorporated by reference in its entirety.

The vibration sensor 380 can comprise a base 400, at least one piezoelectric crystal 402, and a plurality of calibration masses 406. The calibration masses 406 can be distributed circumferentially around the base 400. In the present aspect, the calibration masses 406 can be integrally formed with the base 400; however in other aspects, the calibration masses 406 can be separate components which can be attached to the base 400, such as with a glue, adhesive, mastic, epoxy, or another method such as welding, brazing, soldering, or any other attachment method for example and without limitation. In the present aspect, the calibration masses 406 can extend axially outward from each side of the base 400 with respect to the sensor axis 301. A notch 432 can be defined between each pair of adjacent calibration masses 406, and the calibration masses 406 can vibrate independently from one another.

The piezoelectric crystal 402 can be attached to the base 400, and the piezoelectric crystal 402 can be disposed radially inward from the calibration masses 406 with respect to the sensor axis 301. In some aspects, an additional piezoelectric crystal (not shown) can be attached to the opposite side of the base 400. In the present aspect, the piezoelectric crystals 402 can be bonded to the base 400 with a conductive adhesive. In other aspects, the piezoelectric crystals 402 can be attached to the base 400 through other suitable means such as double-sided tape, various glues, various coatings including elastomeric and silicon coatings among others, pure adhesives, or by a fastener.

In the present aspect, a fastener 408 can extend through the base 400 and piezoelectric crystals 402. The fastener 408 can define a threaded end 410, and a spacer 404 can be fit over the fastener 408 between the base 400 and the threaded end 410. In the present aspect, the threaded end 410 can define a first sensor end 412 of the vibration sensor 380, and a second sensor end 414 can be defined by the calibration masses 406, opposite from the first sensor end 412. The sensor axis 301 can extend through the fastener 408 and the vibration sensor 380 as a whole from the first sensor end 412 to the second sensor end 414.

The threaded end 410 can threadedly engage a threaded hole 780 (shown in FIG. 7) defined by the circumferential wall 312 (shown in FIG. 3) to attached the vibration sensor 380 to the cap body 210 (shown in FIG. 3). With the vibration sensor 380 attached to the cap body 210, and the nozzle cap 150 (shown in FIG. 3) attached to the nozzle 140a (shown in FIG. 1), the vibration sensor 380 can detect vibrations from the fluid system (not shown) and convert the vibrations to a voltage signal. When the vibration sensor 380 is exposed to vibrations, the calibration masses 406 can oscillate axially relative to the base 400 which can produce internal stresses within the piezoelectric crystal 402. Stresses within the piezoelectric crystal 402 can produce a voltage signal which can then be interpreted by the PCB 362 (shown in FIG. 3) to determine if leaks are present within the fluid system.

Figure 5:
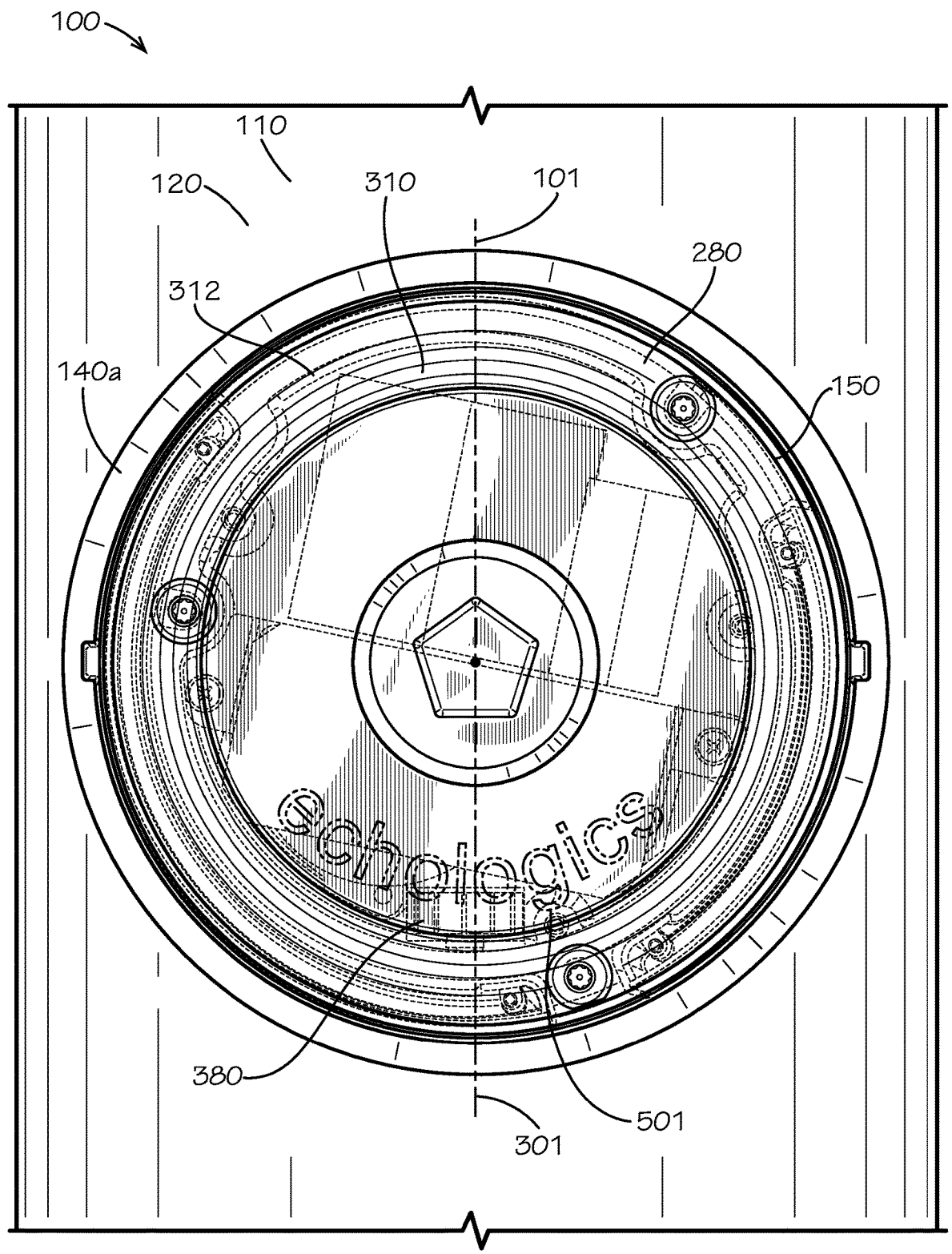
FIG. 5 is a front detail view of the hydrant assembly of FIG. 1 focusing on the nozzle cap with the cap cover shown in transparency and the underlying components shown in dashed lines.

FIG. 5 is a front detail view of the hydrant assembly 100 focusing on the nozzle 140a and the nozzle cap 150 with the cap cover 280 of the nozzle cap 150 shown in transparency with the underlying components shown in dashed lines. Experimentation has revealed that the signal-to-noise ratio detected by the vibration sensor 380 is generally optimized when the sensor axis 301 is aligned with the barrel axis 101 of the barrel 120 of the fire hydrant 110, such as when vertically aligned relative to the direction of gravity as shown in the present aspect.

The cap cover 280 can define indicia 501, which can align with the circumferential placement of the vibration sensor around the circumferential wall 312. For example, in the present aspect, the vibration sensor 380 can be positioned in a six-o-clock position wherein the sensor axis 301 is vertically aligned, and the vibration sensor 380 is positioned at the bottom of the nozzle cap 150. The indicia 501 can also be positioned in the six-o-clock position so that the indicia 501 is approximately centered over the vibration sensor 380. In the present aspect, the indicia 501 can be the ECHOLOGICS logo which can be approximately centered over the vibration sensor 380; however, in other aspects, the indicia 501 can define any combination of words, numbers, and/or symbols to indicate the circumferential position of the vibration sensor 380 along the circumferential wall 312. For example, in some aspects, the indicia could be a line extending across the cap cover 280 which can be positioned parallel to the sensor axis 301 or an arrow indicating the preferred vertical alignment. Because a user cannot see into the cavity 310 in the present aspect, the indicia 501 can be configured to notify a user of the placement of the vibration sensor 380 along the circumferential wall so that the nozzle cap 150 can be optimally oriented when attaching the nozzle cap 150 to the nozzle 140a. In other aspects, some or all of the cap cover 280 can comprise a transparent material configured to provide a view of the orientation of the vibration sensor 380 within the cavity 310.

Figure 6:
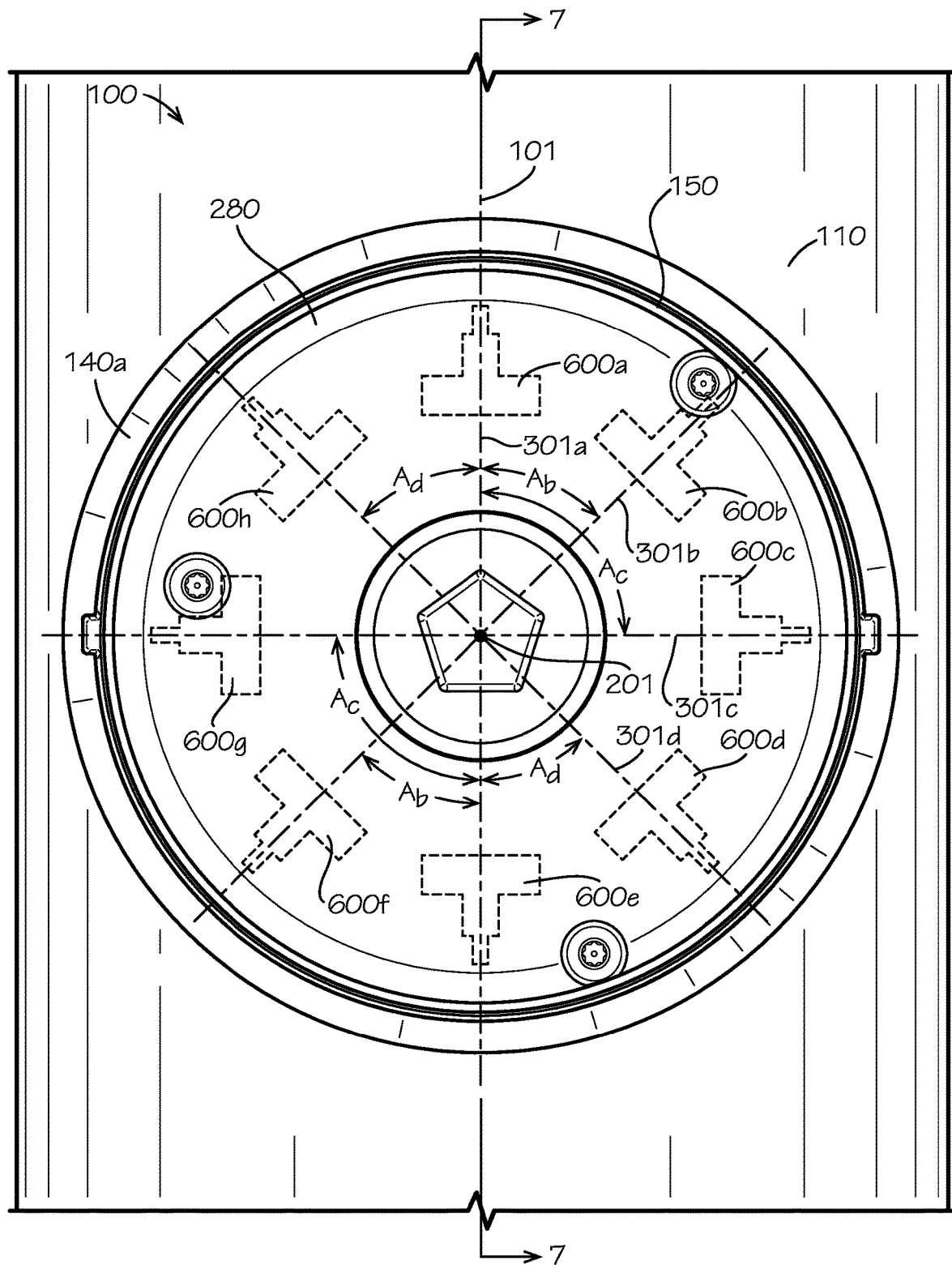
FIG. 6 is a front detail view of the hydrant assembly of FIG. 1 focusing on the nozzle the nozzle cap, which demonstrates various potential positions for the vibration sensor of FIG. 4.

FIG. 6 is a front detail view of the hydrant assembly 100 focusing on the nozzle 140a and the nozzle cap 150 which demonstrates various potential positions 600a-h for the vibration sensor 380 (shown in FIG. 5) and the sensor axis 301, as shown by the dashed lines in the shape of the vibration sensor 380. The cap cover 280 is shown without the indicia 501 (shown in FIG. 5) for clarity. The exemplary potential orientations for the sensor axis 301 are shown as 301a-d.

Sensor axis 301a can correspond to the vertical orientations of the twelve-o-clock position 600a and the six-o-clock position 600e. In these positions, the sensor axis 301a is vertically aligned in parallel to the barrel axis 101 of the fire hydrant 110. These positions generally provide an optimal signal-to-noise ratio, as described above. In these positions, an angle defined between the sensor axis 301a and the barrel axis 101 can equal zero degrees, and therefore, this angle is not shown or labeled.

Sensor axis 301c corresponds to the horizontal orientations of the three-o-clock position 600c and the nine-o-clock position 600g. In these positions, the sensor axis 301c is horizontally aligned, and the sensor axis 301c can be perpendicular to the barrel axis 101. An angle $A_c$ defined between the sensor axis 301c and the barrel axis 101 can equal ninety degrees. Experimentation generally shows that the signal-to-noise ratio is least desirable when the vibration sensor 380 (shown in FIG. 5) is in a horizontal orientation with the sensor axis 301c perpendicular to the barrel axis 101, which is vertical.

The sensor axis 301b corresponds to the positions 600b,f, and the sensor axis 301d corresponds to the positions 600d,h. The sensor axes 301b,d can be oblique to the barrel axis 101. The sensor axis 301b can define an angle $A_b$ with the barrel axis 101, and the sensor axis 301d can define an angle $A_d$. In these positions, the angles $A_b$, $A_d$ can be acute angles measuring less than ninety degrees. In these aspects, the signal-to-noise ratio is generally superior to that of the horizontal orientations of positions 600c,g but generally inferior to the signal-to-noise ratio of the vertical orientations of positions 600a,e. The signal-to-noise ratio improves as the angles $A_b$, $A_d$ decrease to zero degrees, wherein the sensor axes 301b,d align with the barrel axis 101.

The demonstrated positions 600a-h are merely exemplary and should not be viewed as limiting. The vibration sensor 380 (shown in FIG. 5) can be oriented at any angle around the cap axis 201, shown extending out of the page. The sensor axis 301 can be perpendicular to the cap axis 201 regardless of potential orientation or rotational indexing of the nozzle cap 150.

Rotational indexing of the nozzle cap 150 relative to the nozzle 140a can be primarily dictated by the torque required to form a seal between the nozzle cap 150 and the nozzle 140a via the gasket 222 (shown in FIG. 2). For example, in an aspect wherein the internal threading 218 (shown in FIG. 2) of the threaded bore 216 (shown in FIG. 2) is right-handed threading, the nozzle cap 150 can be tightened onto the nozzle 140a by rotating the nozzle cap 150 in a clockwise direction about the cap axis 201 relative to the viewing angle shown. For example, in some aspects, the torque required to form a seal may naturally place the vibration sensor 380 (shown in FIG. 5) in one of the less desirable positions, such as position 600c. In such a case, if the nozzle cap 150 is backed off to place the vibration sensor 380 in the desirable twelve-o-clock position 600a, the seal between the nozzle cap 150 and the nozzle 140a may be compromised, and the nozzle cap 150 can leak. Conversely, a user can attempt to overtighten the nozzle cap 150 towards the desirable six-o-clock position 600e; however, the user may not be able to fully rotate the nozzle cap 150 to vertically align the vibration sensor 380 and achieve optimal signal-to-noise ratio. Additionally, overtightening the nozzle cap 150 can make the nozzle cap 150 difficult to remove, such as in the case of an emergency where firemen may need to open the nozzle 140a.

One solution is to alter a gasket thickness T (shown in FIG. 7) of the gasket 222 (shown in FIG. 7) to adjust the rotational indexing of the nozzle cap 150 relative to the nozzle 140a. By increasing the gasket thickness T of the gasket 222, the rotational indexing of the nozzle cap 150 can be rotated counter-clockwise about the cap axis 201 with respect to the viewing angle shown in aspects wherein the internal threading 218 (shown in FIG. 2) is right-handed threading. For example, if the vibration sensor 380 (shown in FIG. 7) is in position 600b when the nozzle cap 150 is torqued to the required specification to seal the nozzle 140a, the nozzle cap 150 can be removed, and the gasket 222 can be replaced with another gasket 222 having a larger gasket thickness T so that the vibration sensor 380 can be placed in the twelve-o-clock position 600a when the nozzle cap 150 is torqued to the required specification.

Conversely, a thinner gasket 222 can be used to rotate the rotational indexing of the nozzle cap 150 in the clockwise direction about the cap axis 201 with respect to the viewing angle shown. For example, if the vibration sensor 380 is in position 600d when the nozzle cap 150 is torqued to the required specification to seal the nozzle 140a, the nozzle cap 150 can be removed, and the gasket 222 can be replaced with another gasket 222 having a smaller gasket thickness T so that the vibration sensor 380 can be placed in the six-o-clock position 600e when the nozzle cap 150 is torqued to the required specification.

Rather than changing the gasket thickness T of the gasket 222, similar results can be achieved by positioning shims between the gasket 222 and the inner wall 220 (shown in FIG. 2), and a pack of shims of varying thicknesses can be included with an installation kit for the nozzle cap 150. In some aspects, the shim could be attached to the inner wall 220 with an adhesive sealant to prevent leaks between the shim and the inner wall 220. In other aspects, two gaskets 222 can be utilized, and the shim can be positioned between the two gaskets 222 to prevent leaks between the shim and the inner wall 220. The necessary thickness of the shims can be calculated based on the thread pitch of the internal threading 218 (shown in FIG. 2) using the following formula:

$$\frac{\theta}{360 \times TPI} = \text{Shim Thickness or Change in Gasket Thickness } T;$$

wherein θ equals the desired angle of rotational correction in degrees, TPI is the threads-per-inch pitch of the internal threading 218, and shim thickness is measured in inches. For example and without limitation, if the internal threading 218 defines a thread pitch of 5 TPI, then each clockwise 360-degree rotation of the nozzle cap 150 translates the nozzle cap 150 0.20" along the cap axis 201 towards the nozzle 140a. In order to alter the rotational indexing of the nozzle cap 150 counterclockwise by ninety degrees, a 0.05" shim can be added between the gasket 222 and the inner wall 220. The same formula can be utilized to determine the necessary increase or decrease in gasket thickness T (shown in FIG. 7) to achieve the desired rotational indexing of the nozzle cap 150.

In some aspects of the nozzle cap 150, two vibration sensors 380 can be attached to the nozzle cap 150 at a ninety-degree offset from one another along the circumferential wall 312 (shown in FIG. 3). In such an aspect, the nozzle cap 150 would only have to be overtightened or backed off by a maximum of forty-five degrees to position one of the two vibration sensors 380 in one of the vertical orientations: the twelve-o-clock position 600a or the six-o-clock position 600e. In such aspects, the nozzle cap 150 can comprise an accelerometer to determine which of the two vibration sensors 380 is more optimally oriented when taking readings. In some aspects, the gasket 222 can comprise a soft, compressive material, such as a soft rubber like neoprene, which can allow for a greater range of adjustment to the rotational indexing compared to a harder material, such as a hard rubber.

Figure 7:
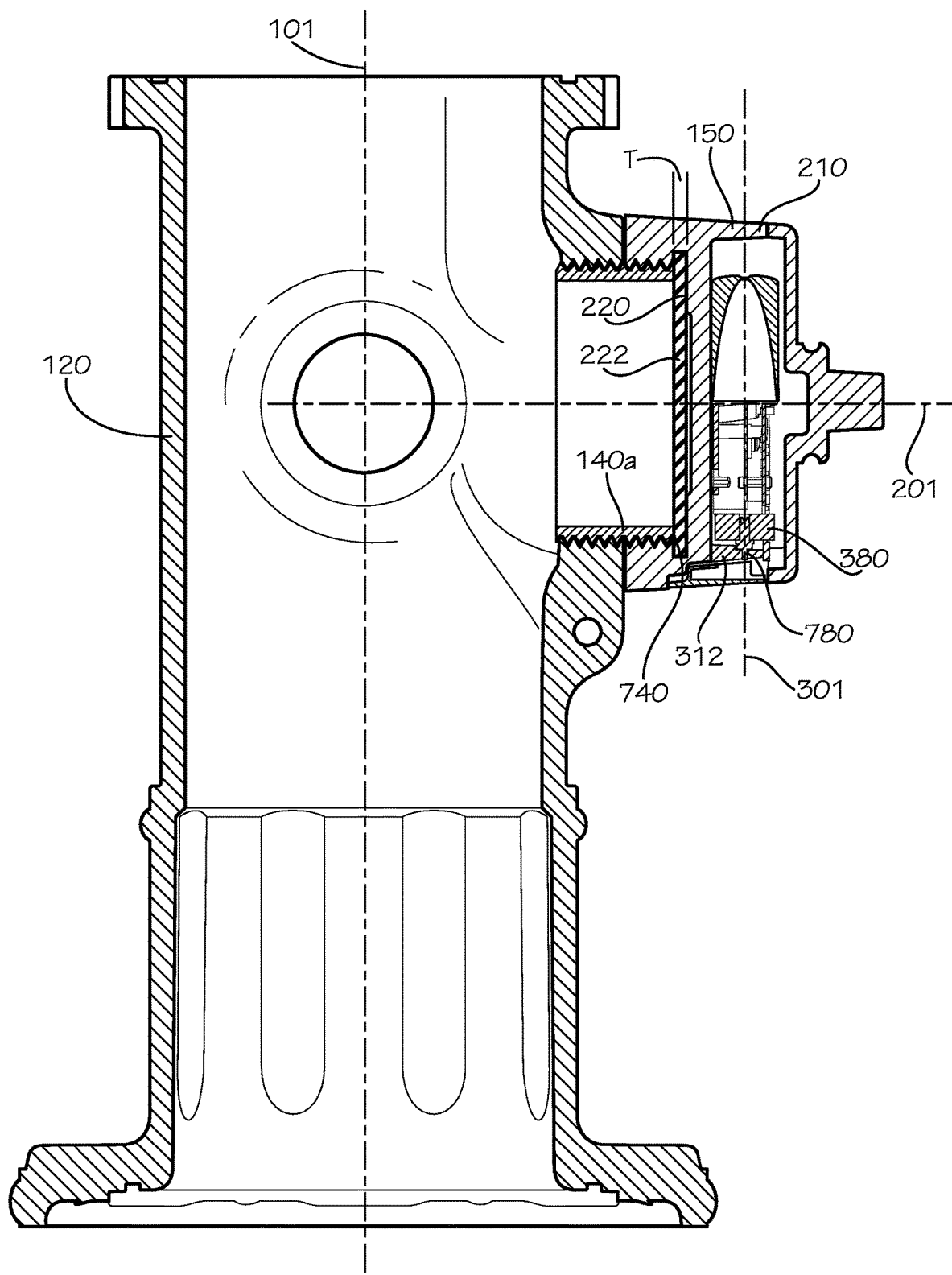
FIG. 7 is a cross-sectional side view of a barrel and the nozzle cap of FIG. 1 taken along line 7-7 shown in FIG. 6.

FIG. 7 is a cross-sectional side view of the barrel 120 and nozzle cap 150 of FIG. 1 taken along line 7-7 shown in FIG. 6. In the aspect shown, the vibration sensor 380 can be in the six-o-clock position, and the sensor axis 301 can be vertically aligned in parallel with the barrel axis 101. Each of the barrel axis 101 and the sensor axis 301 can be perpendicular to the cap axis 201.

As shown and previously described, the gasket 222 can define the gasket thickness T, and the gasket 222 can be positioned between the inner wall 220 of the cap body 210 and a nozzle end 740 of the nozzle 140a. The vibration sensor 380 can also be screwed into the threaded hole 780 defined by the circumferential wall 312 to secure the vibration sensor 380 to the circumferential wall 312.

In other aspects, the vibration sensor 380 can be positioned within the bonnet 180 (shown in FIG. 1) of the fire hydrant 110 (shown in FIG. 1) or within the barrel 120 (shown in FIG. 1) of the fire hydrant 110. In such an aspect, the sensor axis 301 can be vertically aligned parallel with the barrel axis 101 of the barrel 120. Improvement in the signal-to-noise ratio for the vibration sensor 380 can be attributed to aligning the direction of oscillation of the calibration masses 406 (shown in FIG. 4) with the direction of vibration propagation. The calibration masses 406 can oscillate substantially axially along the sensor axis 301 of the vibration sensor 380. The vibrations can originate within the fluid system and then travel substantially vertically up the stand pipe 198 (shown in FIG. 1) to the fire hydrant 110. By vertically aligning the sensor axis 301 parallel to the barrel axis 101, the calibration masses 406 can be ideally positioned to oscillate upwards and downwards, which makes the vibration sensor 380 more sensitive to the vibrations propagating up the stand pipe 198 to the fire hydrant 110.

During experimentation, vibration sensors were installed on a fire hydrant attached to a 6-inch ductile iron water main at a test facility. Vibration sensors were positioned in both vertical and horizontal orientations, and the vibration sensors took readings while water was flowed from valves to simulate leaks in the water main. Across the frequency range 0-1200 Hz, the vertically oriented sensor demonstrated an average 3 dB increase in signal strength relative to the horizontally oriented sensor. Further testing was conducted wherein individuals clapped and yelled in proximity to the fire hydrant to measure sensitivity to airborne background noise, and the vibration sensors in the vertical orientation were found to be less sensitive to background noise. Across the frequency range 0-1200 Hz, the vertically oriented sensor demonstrated an average 8 dB increase in signal-to-noise ratio when comparing the leak simulation to airborne noise.

Further testing was conducted with fire hydrants to determine if the increase in signal-to-noise ratio would offer improved performance in detecting leaks. Vibration sensors in both horizontal and vertical orientations were attached to two separate fire hydrants while leaks of varying sizes were simulated by opening valves in the attached water infrastructure systems. In sixteen out of seventeen conditions tested, the vertically oriented sensors yielded correlations of higher strength than the horizontally oriented sensors, which demonstrates a higher likelihood that the vertically oriented sensors would detect the leak in a real world scenario.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described That which is claimed is:

1. A hydrant assembly comprising:
   a fire hydrant comprising a barrel, the barrel defining a barrel axis extending from a top barrel end of the barrel to a bottom barrel end of the barrel in a vertical direction; and
   a vibration sensor enclosed within the fire hydrant, the vibration sensor defining a sensor axis extending from a first sensor end of the vibration sensor to a second sensor end of the vibration sensor, the vibration sensor defining threading at the first sensor end, the threading defining a thread axis positioned coaxial to the sensor axis, the first sensor end mounted to the fire hydrant, the sensor axis defining an angle relative to the vertical direction, the angle being less than ninety degrees.

2. The hydrant assembly of claim 1, wherein the angle is equal to less than forty-five degrees.

3. The hydrant assembly of claim 2, wherein the sensor axis is parallel to the barrel axis.

4. The hydrant assembly of claim 1, wherein the sensor axis is vertically aligned.

5. The hydrant assembly of claim 1, further comprising a nozzle cap attached to a nozzle of the barrel, the vibration sensor enclosed within a cavity defined by the nozzle cap.

6. The hydrant assembly of claim 5, wherein:
   the nozzle cap defines a cap axis; and
   the cap axis is perpendicular to each of the barrel axis and the sensor axis.

7. The hydrant assembly of claim 5, wherein:
   the nozzle cap defines a cap axis; and
   the angle is adjustable by rotating the nozzle cap about the cap axis on the nozzle.

8. A method for detecting leaks in a fluid system, the method comprising:
   enclosing a vibration sensor within a fire hydrant, the fire hydrant connected in fluid communication with the fluid system; and
   positioning a sensor axis of the vibration sensor at an angle of less than ninety degrees to a vertical direction, the sensor axis extending from a first sensor end of the vibrations sensor to a second sensor end of the vibration sensor, the vibration sensor defining threading at the first sensor end, the threading defining a thread axis positioned coaxial to the sensor axis, the first sensor end mounted to the fire hydrant, the vertical direction being parallel to a barrel axis of the fire hydrant.

9. The method of claim 8, further comprising setting the angle by rotating a nozzle cap of the fire hydrant relative to a nozzle of the fire hydrant, the vibration sensor enclosed within a cavity of the nozzle cap.

10. The method of claim 9, wherein rotating the nozzle cap of the fire hydrant relative to the nozzle of the fire hydrant comprises rotating the nozzle cap about a cap axis defined by the nozzle cap, the cap axis being perpendicular to the sensor axis.

11. The method of claim 9, further comprising setting the angle to zero degrees.

12. The method of claim 9, wherein setting the angle by rotating the nozzle cap of the fire hydrant relative to the nozzle of the fire hydrant comprises selecting a thickness of a gasket positioned between the nozzle and the nozzle cap to adjust a rotational indexing of the nozzle cap relative to the nozzle.

13. The method of claim 8, further comprising vertically aligning the sensor axis.

14. The method of claim 8, wherein the first sensor end and the second sensor end are defined by a fastener of the vibration sensor, and wherein the fastener couples the vibration sensor to the fire hydrant.

15. The hydrant assembly of claim 1, wherein the first sensor end and the second sensor end are defined by a fastener of the vibration sensor, and wherein the fastener couples the vibration sensor to the fire hydrant.

16. The hydrant assembly of claim 5, wherein:
   the nozzle cap further comprises a cap cover;
   the cap cover at least partially encloses the vibration sensor;
   the cap cover defines indicia aligned with the vibration sensor; and
   the indicia are configured to notify a user of a placement of the vibration sensor within the nozzle cap.

17. The hydrant assembly of claim 6, wherein:
   the nozzle cap defines a circumferential wall;
   the vibration sensor is coupled to the circumferential wall; and
   the vibration sensor extends radially inwards from the circumferential wall with respect to the cap axis.

18. The hydrant assembly of claim 6, wherein:
   the vibration sensor is a first vibration sensor;
   the sensor axis is a first sensor axis;
   a second vibration sensor is enclosed by the fire hydrant;
   the second vibration sensor defines a second sensor axis extending from a third sensor end of the second vibration sensor to a fourth sensor end of the second vibration sensor;
   the third sensor end and the fourth sensor end are defined by a fastener of the second vibration sensor; and
   the second sensor axis is aligned perpendicular to the cap axis.

19. The hydrant assembly of claim 1, wherein the first sensor end is received by a threaded hole defined by the fire hydrant.

20. A hydrant assembly comprising:
   a fire hydrant comprising a barrel, the barrel defining a barrel axis extending from a top barrel end of the barrel to a bottom barrel end of the barrel in a vertical direction;
   a vibration sensor enclosed within the fire hydrant, the vibration sensor defining a sensor axis extending from a first sensor end of the vibration sensor to a second sensor end of the vibration sensor, the first sensor end mounted to the fire hydrant, the sensor axis defining an angle relative to the vertical direction, the angle being less than ninety degrees; and
   a nozzle cap attached to a nozzle of the barrel, the vibration sensor enclosed within a cavity defined by the nozzle cap, the nozzle cap comprising a cap cover, the cap cover at least partially enclosing the vibration sensor, the cap cover defining indicia aligned with the vibration sensor, the indicia configured to notify a user of a placement of the vibration sensor within the nozzle cap.

21. A hydrant assembly comprising:
a fire hydrant comprising a barrel, the barrel defining a barrel axis extending from a top barrel end of the barrel to a bottom barrel end of the barrel in a vertical direction;
a vibration sensor enclosed within the fire hydrant, the vibration sensor defining a sensor axis extending from a first sensor end of the vibration sensor to a second sensor end of the vibration sensor, the first sensor end mounted to the fire hydrant, the sensor axis defining an angle relative to the vertical direction, the angle being less than ninety degrees; and
a nozzle cap attached to a nozzle of the barrel, the vibration sensor enclosed within a cavity defined by the nozzle cap, the nozzle cap defining a cap axis, the cap axis is perpendicular to each of the barrel axis and the sensor axis, the nozzle cap defining a circumferential wall, the vibration sensor extending radially inwards from the circumferential wall with respect to the cap axis.

22. A hydrant assembly comprising:
a fire hydrant comprising a barrel, the barrel defining a barrel axis extending from a top barrel end of the barrel to a bottom barrel end of the barrel in a vertical direction;
a first vibration sensor enclosed within the fire hydrant, the first vibration sensor defining a first sensor axis extending from a first sensor end of the first vibration sensor to a second sensor end of the first vibration sensor, the first sensor end mounted to the fire hydrant, the first sensor axis defining an angle relative to the vertical direction, the angle being less than ninety degrees;
a nozzle cap attached to a nozzle of the barrel, the first vibration sensor enclosed within a cavity defined by the nozzle cap, the nozzle cap defining a cap axis, the cap axis being perpendicular to each of the barrel axis and the first sensor axis; and
a second vibration sensor enclosed by the fire hydrant, the second vibration sensor defining a second sensor axis extending from a third sensor end of the second vibration sensor to a fourth sensor end of the second vibration sensor, the third sensor end and the fourth sensor end defined by a fastener of the second vibration sensor, the second sensor axis being aligned perpendicular to the cap axis.

23. A hydrant assembly comprising:
a fire hydrant comprising:
a barrel defining a barrel axis extending in a vertical direction; and
a nozzle cap mounted to the barrel, the nozzle cap defining a cap axis positioned perpendicular to the barrel axis, the nozzle cap defining a circumferential wall extending circumferentially around the cap axis, the circumferential wall at least partially defining a cavity within the nozzle cap; and
a vibration sensor defining a first sensor end and a second sensor end positioned opposite from the first sensor end, the first sensor end coupled to the circumferential wall, the second sensor end extending away from the circumferential wall and inwards into the cavity, the second sensor end positioned radially inward from the circumferential wall with respect to the cap axis, the vibration sensor defining a sensor axis extending from the first sensor end to the second sensor end, the sensor axis defining an angle relative to the vertical direction of less than ninety degrees.

24. The hydrant assembly of claim 23, wherein the angle is equal to forty-five degrees or less.

25. The hydrant assembly of claim 1, wherein the angle is less than eighty degrees.

26. The hydrant assembly of claim 1, wherein the angle is less than ten degrees.

27. The method of claim 8, wherein positioning the sensor axis of the vibration sensor at the angle of less than ninety degrees to the vertical direction further comprises positioning the sensor axis of the vibration sensor at the angle of less than eighty degrees to the vertical direction.

28. The method of claim 8, wherein positioning the sensor axis of the vibration sensor at the angle of less than ninety degrees to the vertical direction further comprises positioning the sensor axis of the vibration sensor at the angle of less than ten degrees to the vertical direction.

* * * * *